(12) United States Patent
Winrow et al.

(10) Patent No.: US 9,940,137 B2
(45) Date of Patent: Apr. 10, 2018

(54) PROCESSOR EXCEPTION HANDLING USING A BRANCH TARGET CACHE

(71) Applicant: ARM LIMITED, Cambridge (GB)

(72) Inventors: Matthew Lee Winrow, Cambridge (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 240 days.

(21) Appl. No.: 15/042,306

(22) Filed: Feb. 12, 2016

(65) Prior Publication Data

US 2016/0246604 A1    Aug. 25, 2016

(30) Foreign Application Priority Data

Feb. 19, 2015 (GB) .................................. 1502817.8

(51) Int. Cl.
*G06F 9/30* (2006.01)
*G06F 9/38* (2018.01)
*G06F 12/0875* (2016.01)

(52) U.S. Cl.
CPC ........ *G06F 9/3802* (2013.01); *G06F 9/30054* (2013.01); *G06F 12/0875* (2013.01); *G06F 2212/452* (2013.01)

(58) Field of Classification Search
None
See application file for complete search history.

(56) References Cited

U.S. PATENT DOCUMENTS 6,044,430 A      3/2000  MacDonald
6,425,075 B1 *   7/2002  Stiles ................... G06F 9/3804
                                                         711/168

2002/0052992 A1      5/2002  Arora et al.
2009/0198985 A1 *    8/2009  Levenstein .......... G06F 9/3806
                                                              712/240
2010/0036987 A1      2/2010  Streett et al.
2011/0264894 A1 *   10/2011  Lin ........................ G06F 9/322
                                                              712/207

FOREIGN PATENT DOCUMENTS

EP          0 525 666          2/1993

OTHER PUBLICATIONS

Search Report for GB 1502817.8, dated Aug. 25, 2015, 3 pages.

* cited by examiner

*Primary Examiner* — Corey S Faherty
(74) *Attorney, Agent, or Firm* — Nixon & Vanderhye P.C.

(57) ABSTRACT

Data processing apparatus comprises a processor configured to execute instructions, the processor having a pipelined instruction fetching unit configured to fetch instructions from memory during a pipeline period of two or more processor clock cycles prior to execution of those instructions by the processor; exception logic configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address; and an exception cache configured to cache information, for at least one of the exception types, relating to execution of the exception instruction at the exception address corresponding to that exception type and to provide the cached information to the processor in response to detection of an exception of that exception type.

14 Claims, 15 Drawing Sheets

| Index | Valid? | Next fetch address | Instr 1 | Instr 2 | Instr 3 |
|---|---|---|---|---|---|
| | | | | | |
| | | | | | |
| | | | | | |
| | | | | | |
1910 1920 1930 1940
FIG. 19
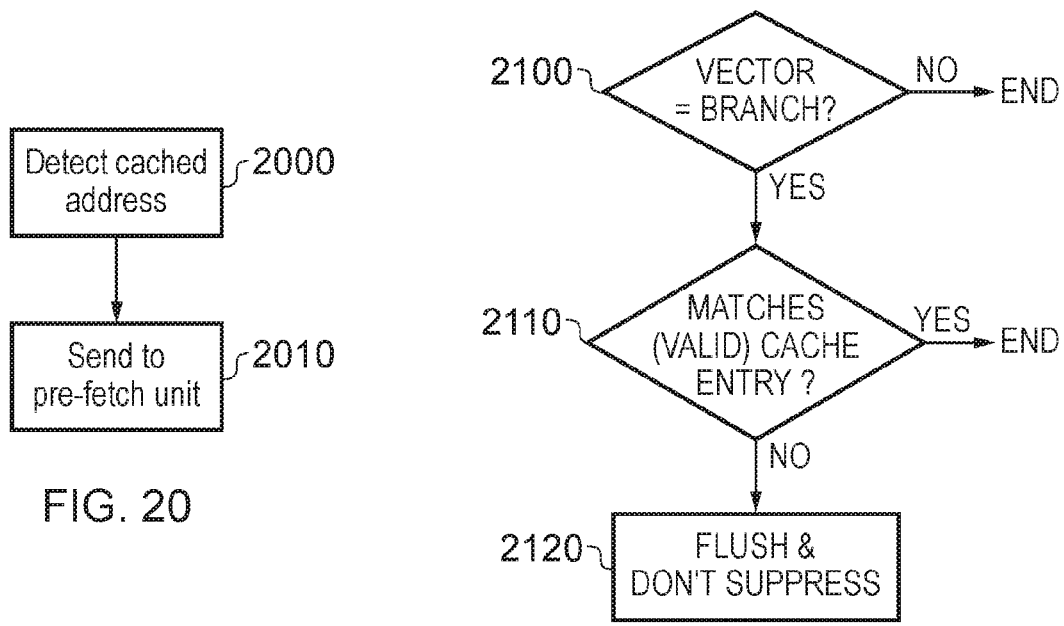
FIG. 20
FIG. 21
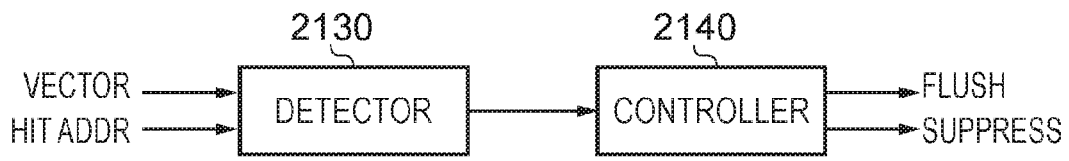
FIG. 22

PROCESSOR EXCEPTION HANDLING USING A BRANCH TARGET CACHE

This application claims priority to GB Patent Application No. 1502817.8, filed 19 Feb. 2015, the entire contents of which is hereby incorporated by reference.

BACKGROUND

The present technique relates to methods and apparatus for handling processor exceptions.

During the normal flow of execution through a program executed by a processor, the processor's program counter increases sequentially through the program address space, with branch instructions causing branching of program flow to other addresses, and other instructions causing links to subroutines followed by returns from those subroutines. Processor exceptions occur when this flow of execution defined by the program instructions is diverted, to allow the processor to handle events generated by internal or external sources. These events can be of different types or categories, with examples of such event types including: externally generated interrupts, for example by a peripheral device (often referred to by the acronym "IRQ", for "interrupt request"), an attempt by the processor to execute an undefined instruction, or a requirement to access a privileged operating system function. When an exception occurs, the program flow is changed so as to deal with the exception, while still preserving the previous processor status, so that execution of the program code that was running when the exception occurred can resume when the appropriate exception routine has completed.

In some processor architectures an exception "vector table" is provided which contains instructions known as vectors, one such vector being provided for each type of exception. In response to an exception the processor fetches the relevant instruction in the vector table (appropriate to that exception type) and executes it. In many instances, the instruction in the vector table will in fact be a branch instruction diverting program flow to a so-called "handler" (a set of instructions for execution) to service the exception. The address in the vector table relating to an exception type may be referred to as an "exception address" relating to that exception type.

Some types of exception can have multiple potential causes. For example IRQs can be initiated by a range of peripheral devices, so that a first or early action of the handler is to detect the source or cause of the interrupt and then branch to a further, more specific, handler to service that particular IRQ. This can mean that for IRQs, and potentially some other exception types, the processor can be forced to divert program flow to a new address three times before it starts to execute the final (specific) event handler: once for the vector fetch, once for the first (generic) handler for that event type, and once for the specific handler.

In the case of a pipelined processor, each of these diversions of program flow can involve flushing (clearing) the processor pipeline, which incurs a time penalty in the form of a delay while the pipeline is refilled. For example, in a pipeline using (say) three or four instruction fetch stages, empirical tests have found that this issue can account for a significant proportion of the overall latency relating to interrupt handling. But as well as potentially causing additional latency, the use of multiple stages of flushing and reloading the pipeline can adversely affect power consumption of the processor, because the processor has to flush instructions that it has needlessly fetched.

SUMMARY

In an example arrangement there is provided data processing apparatus comprising: a processor configured to execute instructions, the processor having a pipelined instruction fetching unit configured to fetch instructions from memory during a pipeline period of two or more processor clock cycles prior to execution of those instructions by the processor; exception logic configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address; and an exception cache configured to cache information, for at least one of the exception types, relating to execution of the exception instruction at the exception address corresponding to that exception type and to provide the cached information to the processor in response to detection of an exception of that exception type.

Another example arrangement provides a data processing method comprising: fetching instructions from memory during a pipeline period of two or more processor clock cycles prior to execution of those instructions by a processor; caching information, for at least one exception type of a plurality of possible exception types, relating to execution of an exception instruction at an exception address corresponding to that exception type; detecting a processing exception; in response to a detected processing exception, storing a current processor status and diverting program flow to the exception address dependent upon the exception type of the detected processing exception so as to initiate fetching of an exception instruction at the exception address: and providing the cached information relating to the exception type of the detected processing exception to the processor.

Another example arrangement provides data processing apparatus comprising: means for executing instructions, the executing means having a pipelined instruction fetching means for fetching instructions from memory during a pipeline period of two or more processor clock cycles prior to execution of those instructions; means for controlling operations in response to processing exceptions, responsive to a detected processing exception having an exception type selected from a plurality of exception types, to store a current processor status and diverting program flow to an exception address dependent upon the exception type so as to control the instruction fetching unit to initiate fetching of an exception instruction at the exception address; and exception caching means for caching information, for at least one of the exception types, relating to execution of the exception instruction at the exception address corresponding to that exception type and for providing the cached information to the executing means in response to detection of an exception of that exception type.

Another example arrangement provides an exception cache configured to cache information, for at least one of a plurality of possible processing exception types of a processor, relating to execution of the exception instruction by the processor at an exception address corresponding to that exception type and to provide the cached information to the processor in response to detection of an exception of that exception type, the exception cache comprising a flag, associated with each exception type for which the exception cache is configured to cache information, indicating whether the exception cache holds currently valid information for that exception type.

Another example arrangement provides data processing apparatus comprising: a processor configured to execute instructions. the processor having a pipelined instruction fetching unit configured to fetch instructions from memory during a pipeline period of two or more processor clock cycles prior to execution of those instructions by the processor; exception logic configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address; and an exception cache configured to cache information, for at least one of the exception types, relating to execution of the exception instruction at the exception address corresponding to that exception type and to provide the cached information to the processor in response to detection of an exception of that exception type; in which: the exception cache is configured to cache information only in respect of instances in which the exception instruction is a branch instruction; the cached information comprises an address dependent upon a branch target of that branch instruction; the instruction fetching unit is configured to initiate fetching of an instruction at the branch target address in response to receipt of the cached information from the exception cache; and the exception cache is configured, in an instance in which the exception cache has provided a cached branch target address to the processor, to inhibit an operation of the processor in response to a branch instruction to delete any instructions currently being fetched by the pipelined instruction fetching unit.

Another example arrangement provides a data processing method comprising; fetching instructions from memory during a pipeline period of two or more processor clock cycles prior to execution of those instructions by a processor; caching information, for at least one exception type of a plurality of possible exception types, relating to execution of an exception instruction at an exception address corresponding to that exception type, the caching step comprising caching information only in respect of instances in which the exception instruction is a branch instruction, the cached information comprising an address dependent upon a branch target of that branch instruction; detecting a processing exception; in response to a detected processing exception, storing a current processor status and diverting program flow to the exception address dependent upon the exception type of the detected processing exception so as to initiate fetching of an exception instruction at the exception address; providing the cached information relating to the exception type of the detected processing exception to the processor; initiating fetching of an instruction at the branch target address in response to receipt of the cached information from the exception cache; and inhibiting an operation of the processor in response to a branch instruction to delete any instructions currently being fetched by the fetching step, in an instance in which the providing step has provided a cached branch target address to the processor.

Another example arrangement comprises a exception cache configured to cache information, for at least one of a plurality of possible processing exception types of a processor, relating to execution of the exception instruction by the processor at an exception address corresponding to that exception type and to provide the cached information to the processor in response to detection of an exception of that exception type, the exception cache comprising a flag, associated with each exception type for which the exception cache is configured to cache information, indicating whether the exception cache holds currently valid information for that exception type; in which: the exception cache is configured to cache information only in respect of instances in which the exception instruction is a branch instruction, the cached information comprising an address dependent upon a branch target of that branch instruction; and the exception cache is configured, in an instance in which the exception cache has provided a cached branch target address to the processor, to inhibit an operation of the processor in response to a branch instruction to delete any instructions currently being fetched.

Further respective aspects and features of the present technology are defined by the appended claims.

BRIEF DESCRIPTION OF THE DRAWINGS

The present technique will be described further by way of example only, with reference to embodiments thereof as illustrated in the accompanying drawings, in which:

FIG. 19 schematically illustrates another example of a data structure of the exception cache of FIG. 14;

FIG. 20 is a schematic flowchart illustrating an address output step relating to the data structure of FIG. 19;

FIG. 21 is a schematic flow chart relating to a cache flushing operation; and

FIG. 22 is a schematic diagram of a cache flushing arrangement.

DESCRIPTION OF EMBODIMENTS

Figure 1:
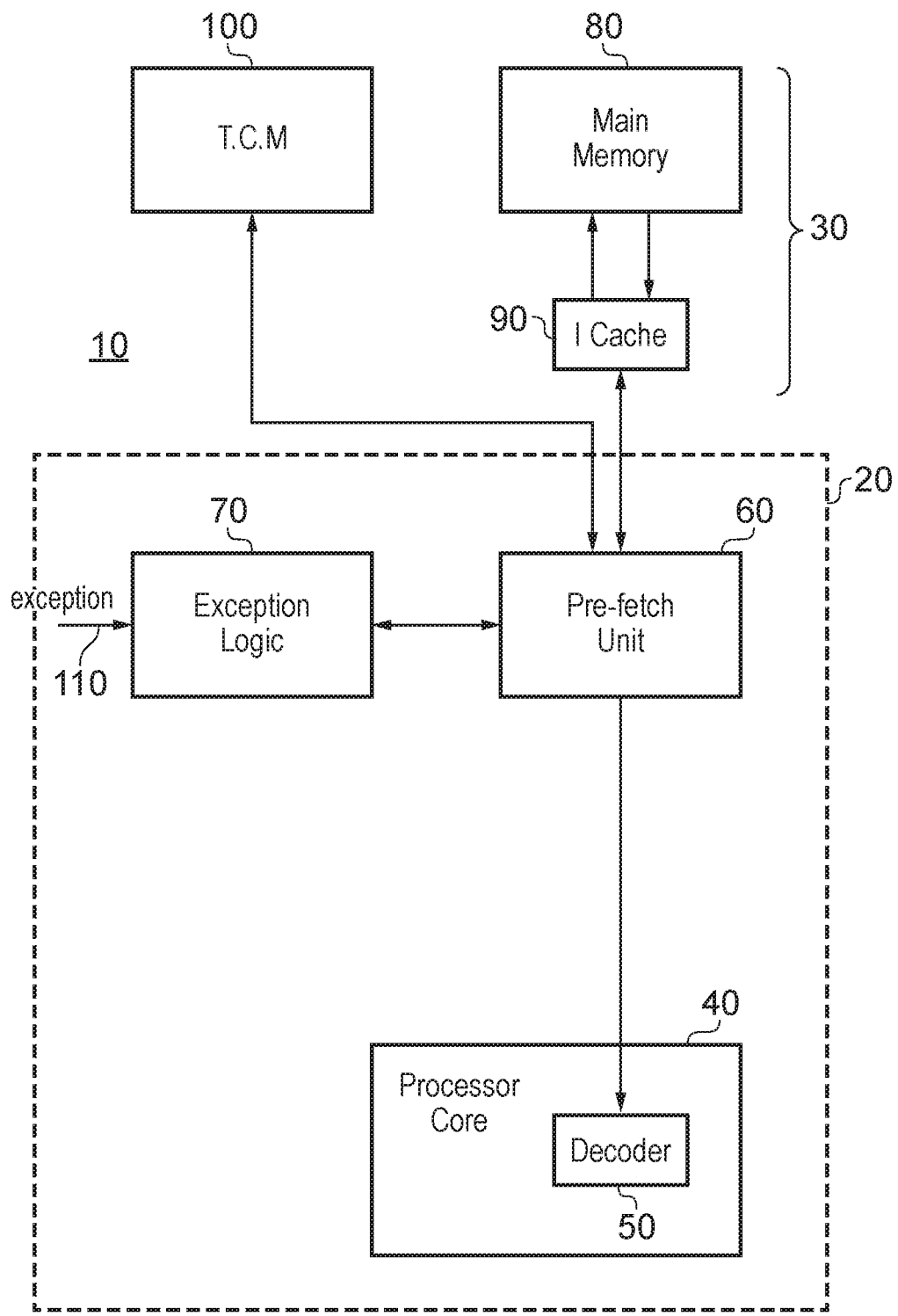
FIG. 1 is a schematic diagram of a previously proposed processor system.

Before discussing the embodiments with reference to the accompanying figure, the following description of embodiments is provided.

In accordance with one example embodiment a processor is configured to execute instructions, the processor having a pipelined instruction fetching unit configured to fetch instructions from memory during a pipeline period of two or more processor clock cycles prior to execution of those instructions by the processor. Exception logic is configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address. An exception cache is configured to cache information, for at least one of the exception types, relating to execution of the exception instruction at the exception address corresponding to that exception type and to provide the cached information to the processor in response to detection of an exception of that exception type. The cached information can be, for example, branch address information relating to a branch instruction which would otherwise be executed in response to an exception, one or more instructions (or representations of those instructions) to be executed in response to an exception, both of these, or other information. The arrangement can reduce the time taken to execute a response (or to initiate the execution of a response) to an exception. Such an arrangement can provide a useful reduction in latency in, for example, the handling of interrupt exceptions in, for example, a real-time data processing system.

In order to avoid errors, misdirection, or the execution of the wrong instructions, in some example embodiments the exception cache comprises a flag, associated with each exception type for which the exception cache is configured to cache information, indicating whether the exception cache holds currently valid information for that exception type, and to provide the cached information to the processor in response to detection of an exception of an exception type only if the respective flag indicates that the cached information is currently valid.

The exception cache could be pre-populated with data, for example at system initialisation. However, in some embodiments an automatic populating arrangement is provided, so that (for example) the exception cache is populated with data at the first instance of each relevant type of exception after system initialisation or after an occasion in which the validity flag is revoked. In such an arrangement, in response to an instance of an exception type for which the respective flag indicates that the exception cache does not hold currently valid information, the exception cache is configured: to derive and store information from the execution, by the processor, of the exception instruction; and to set the flag associated with that exception type to indicate that the exception cache holds currently valid information.

There are various reasons why the validity flag might be cancelled or revoked. In some embodiments the exception cache is configured to detect an instance of a circumstance relating to one or more of the exception instructions and, in response to such a detection, to set at least some of the flags to indicate that the exception cache does not hold currently valid information.

Such a detected circumstance being selected from the list consisting of:

(i) a change of one or more of the exception addresses (such as a change to a base address of a vector table, which would mean that information cached from the previous address may no longer be valid);

(ii) a change of an instruction type of one or more of the exception instructions (for example, if a change is made between 32 bit and 16 bit instructions, cached information may relate to the previously used instruction set);

(iii) a write operation in respect of a memory address in a memory region including one or more of the exception addresses (normally write operations to a vector table are discouraged but they may not be prohibited, depending on the system design. If a write is made, then the validity of any cached information is placed in doubt. In some examples, to avoid having to decode detailed addresses relating to the vector table, a larger region encompassing the address range of the vector table may be used in this test).

(iv) a change in memory type of a memory region including one or more of the exception addresses (for example, a change in which the vector table is no longer provided in a tightly coupled memory region).

(v) a mismatch between cached information relating to a currently handled exception and actual information relating to the currently handled exception (see for example FIGS. 21 and 22 described below).

The exception cache could be indexed in response to, for example. an exception number or a virtual address, but in order to avoid the need to decode such data (and therefore to potentially improve the exception cache's latency), in some examples in response to a detected processing exception, the exception logic is configured to provide to the exception cache at least data defining the exception type of the detected processing exception; and data defining the exception address corresponding to the detected processing exception.

Although information could be cached in respect of all exception types, there are some exception types which can be more time critical than others, so that in example embodiments the exception cache is configured to cache information only in respect of a subset of the exception types: and in response to a detected processing exception, the exception logic is configured to provide to the exception cache one or more flags indicating whether the detected processing exception has an exception type in the subset of exception types. Examples of such time critical exception types are exception types corresponding to processor interrupts.

In the case of systems where the exception logic can be configured such that exceptions are taken to one of several levels of execution privilege, it would be possible just to invalidate the cached information at a change in exception execution privilege, but to avoid having to do this (and then having to repopulate the cache), in example embodiments, in response to a detected processing exception, the exception logic is configured to provide to the exception cache at least data defining an execution privilege relating to the detected processing exception; and the exception cache is configured to cache information in respect of each of a set of two or more execution privileges.

Although various types of information could be cached, in respect of different types of instruction. in some examples (for example, those in which the cached information represents a branch target address) the exception cache is configured to cache information only in respect of instances in which the exception instruction is a branch instruction; the cached information comprises an address dependent upon a branch target of that branch instruction; and the instruction fetching unit is configured to initiate fetching of an instruction at the branch target address in response to receipt of the cached information from the exception cache.

Some types of branch instruction can have a branch target address which can vary according to information held outside of the instruction itself, for example a processor register. To avoid uncertainty in the validity of the cached information, in example embodiments the branch instruction is an unconditional branch instruction having a branch target address defined by address information forming part of the instruction.

To avoid problems caused by the pre-fetch pipeline flushing instructions which are being fetched early in response to the cached information, in embodiments of the technology the exception cache is configured, in an instance in which the exception cache has provided a cached branch target address to the processor, to inhibit an operation of the processor in response to a branch instruction to delete any instructions currently being fetched by the pipelined instruction fetching unit.

In some example embodiments the cached information comprises at least a representation of one or more instructions to be executed by the processor in response to the processing exception. In this case, the one or more instructions may comprise instructions selected from the list consisting of:

(i) one or more instructions starting from the exception address; and (ii) one or more instructions starting from a branch target address of a branch instruction at the exception address.

To avoid fetching the same instructions again, in such instances the exception cache is configuredd to provide to the instruction fetching unit a next address for instruction fetching, the next address being an instruction address following, in the program flow, a last one of the instructions for which the exception cache provides representations to the processor.

Referring now to the drawings, FIG. 1 is a schematic diagram of a previously proposed processor system 10 comprising a data processing apparatus 20 connected to a memory arrangement 30.

The data processing apparatus 20 comprises a processor core 40 including (amongst other items, not shown) an instruction decoder 50; an instruction pre-fetch unit 60 and exception logic 70. It is noted that other logic or components may be present, but these are not shown for clarity of the diagram.

The memory arrangement 30 comprises a main memory 80, an instruction cache (I-cache) 90 disposed between the main memory 80 and the pre-fetch unit 60, and a so-called tightly coupled memory (TCM) 100. Note that the TCM could instead be part of the data processing apparatus 20.

The pre-fetch unit 60 acts as a pipelined instruction fetching unit configured to fetch instructions from memory during a pipeline period of two or more processor clock cycles prior to execution of those instructions by the processor core 40. Generally speaking, the pre-fetch unit 60 is configured to fetch instructions from the instruction cache 90 or, if they are not present in the instruction cache, from the main memory 80 or any intervening cache levels (which, for simplicity of the diagram, are not shown in FIG. 1) and to route those instructions to the decoder 50 of the processor core 40 for decoding. The pre-fetch unit 60 can also fetch instructions from the TCM 100.

The processor core 40 and the pre-fetch unit 60 therefore cooperate to provide an example of a processor configured to execute instructions, the processor having a pipelined instruction fetching unit configured to fetch instructions from memory during a pipeline period of two or more processor clock cycles prior to execution of those instructions by the processor.

The reason that the instruction cache 90 is used is that typical processor cores can process instructions and data rather faster than they can be handled by off-chip memories. Access to the main memory 80 can therefore be relatively slow, potentially taking several processor clock cycles or even several tens of processor clock cycles. This is because the main memory 80 is typically implemented as an off-chip memory system, which is to say that the main memory 80 is embodied as one or more separate integrated circuits to that on which the data processing apparatus 20 is embodied. In contrast, the instruction cache 90 (and the tightly coupled memory 100) are generally implemented on the same integrated circuit as the processor core 40 and are arranged so as to provide access to the stored data and instructions at a comparable speed to the processing speed of the processor core.

This means that if a required item such as a next instruction is present in the instruction cache 90, then accessing that required item from the instruction cache 90 can be significantly quicker than accessing it from the main memory 80. However, if there is a so-called "cache miss", such that a required item is not present in the cache, that it then has to be accessed from the main memory 80, and typically loaded into the cache, which can be a rather slower process. The result is that in many situations, using the instruction cache can provide an improvement in the average speed of memory access, but from one particular memory access operation to another there can be a significant variation in memory access speed. In other words, the use of the instruction cache 90 can introduce some unpredictability in the speed of access of a next-required instruction.

The TCM is a low-latency memory area which can be used by the processor without this issue of unpredictability. The TCM 100 has a processor-selectable base address such that the address range corresponding to the data storage provided by the TCM 100 can be placed, by the processor setting values in a register, anywhere in the physical address map. Typical uses of the TCM include storing time-critical program instructions such as program instructions relating to real time tasks or interrupt-handling routines. In some examples the vector table may be held in the TCM.

As mentioned above, the pre-fetch unit is a pipelined arrangement which operates over a plurality of processor clock cycles. In an example arrangement, a four-stage pre-fetch unit is used. This corresponds to the examples which will be discussed below. However, it will be appreciated that different numbers of stages may be used, such as a three-stage or a five-stage pre-fetch unit. In the example four-stage pre-fetch unit, if the pre-fetch unit starts to load an instruction from a particular address in a processor clock cycle n, that instruction is available for execution in the processor clock cycle n+3.

The exception logic 70 handles so-called exceptions, and in particular is configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address. During normal program flow, the program counter associated with the processor core 40 increases sequentially through the address space, unless a branch occurs to another address or a so-called branch-with-link occurs to make use of a subroutine. An exception occurs when this normal flow of execution is diverted to allow the processor to handle different events corresponding to internal or external items. These events might be (for example) externally generated interrupts, for example when a peripheral device requires a newly-captured data item to be processed, or internally generated events such as the processor trying to access an undefined or unallowable memory address. It is known to handle multiple different exception types in different ways. Some examples of exception types are provided in the following list:

Reset

A "hard" reset occurs when a particular physical connection to the processor (such as a processor reset pin) is asserted. A "soft" reset can achieve the same effect without requiring an assertion of the reset pin, by branching program flow to the reset vector in the exception vector table.

Undefined Instruction

This event type occurs if neither the processor, nor any attached coprocessor, recognizes the currently executing instruction.

Software Interrupt (SWI)

This is a user-defined synchronous interrupt instruction.

Prefetch Abort

This event type occurs when the processor attempts to execute an instruction that was not fetched, because the address was illegal. An illegal virtual address is one that does not currently correspond to an address in physical memory, or one that the memory management subsystem has determined is inaccessible to the processor in its current mode.

Data Abort

A data abort occurs when a data transfer instruction attempts to load or store data at an illegal address.

IRQ (Interrupt Request)

An IRQ happens when the processor external interrupt request pin is asserted and interrupts are currently enabled.

FIQ (Fast Interrupt Request)

An FIQ is a response to the processor external fast interrupt request pin being asserted when fast interrupts are currently enabled.

In operation, the exception logic 70 responds to a control signal 110 indicating that an exception has occurred. In fact, although a single control signal 110 is provided for simplicity of the diagram, the exception logic 70 is in fact responsive to multiple different sources of exception events such as circuitry connected to external connections or pins of the data processing apparatus 20 and logic for detecting abort or undefined operations by the processor core 40. In response to the control signal 110, the exception logic instructs the pre-fetch unit 60 to empty or flush the pre-fetch pipeline (which is to say, to discard any instructions which are part-way through the multi-stage pre-fetch pipeline) and to start to fetch a first instruction of program code relating to the handling of the exception.

Figure 2:
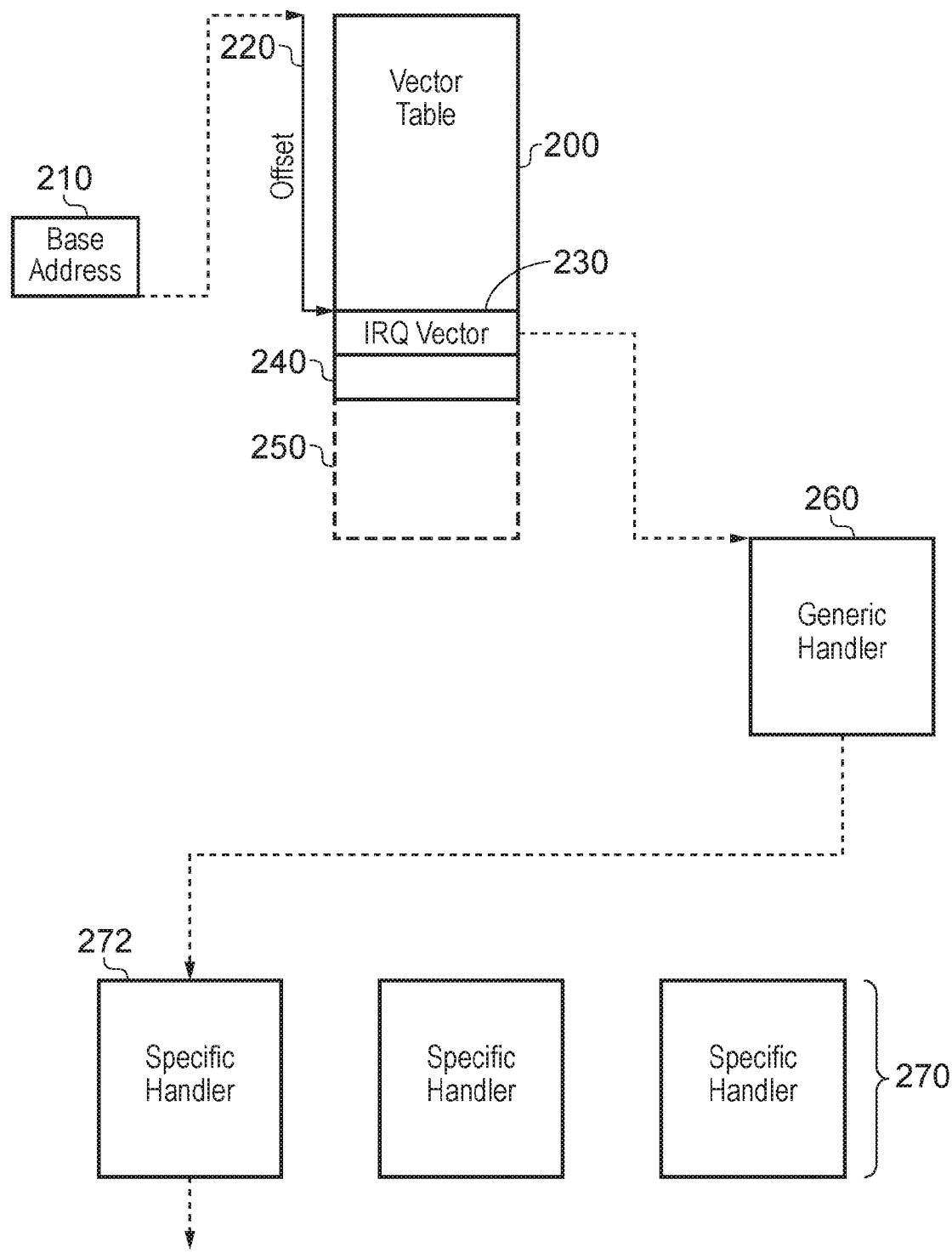
FIG. 2 schematically illustrates an exception handling process.

FIG. 2 schematically illustrates an exception handling process.

In order to handle different exception types using program code specific to those exception types, a so-called vector table 200 is provided. The vector table 200 contains branch instructions to the start address of each of a set of exception handlers (program code routines for dealing with an exception of a particular exception type), with one exception handler being provided for each exception type.

The vector table 200 may be provided at a predetermined or fixed position within the memory address space, for example having a start address of 0 at the bottom of the address space. However, in other arrangements a register 210 (sometimes referred to as a VBAR register) indicates the base address within the memory space of the vector table 200.

A particular entry in the vector table is then selected according to a numerical value associated with each exception type. For example, the numerical value associated with an IRQ is 18h (where the suffix of a lowercase h signifies a hexadecimal representation). This value is used as an offset 220 from the base address so as to provide a particular address 230 within the vector table 200. Note however that other values could be used. The address 230 points to a single instruction, which in this example is referred to as the "IRQ vector", which is used to initiate processing of the IRQ. In some examples, the vectors (such as the IRQ vector) have the form of an unconditional direct branch instruction, for example having a notation "B address", indicating an instruction which branches to address.

So, each exception type has a corresponding numerical value which provides a respective offset into the vector table so that the appropriate vector for that exception type is accessed. Just one exception type, the fast interrupt or FIQ, is typically handled differently. In some examples, the numerical value associated with an FIQ is the highest numerical value of all of those associated with the different exception types. This means that the instruction in the vector table which is accessed in response to an FIQ exception is in fact the last instruction 240 in the vector table. In this particular instance there is no need for this final instruction to be a branch to another area of memory, but instead it can be simply the first instruction of an FIQ handling routine, with the remainder of the FIQ handling routine residing in memory space 250 immediately following the instruction 240. This step can speed up the initial handling of an FIQ exception by avoiding the need for a branch operation.

Figure 3:
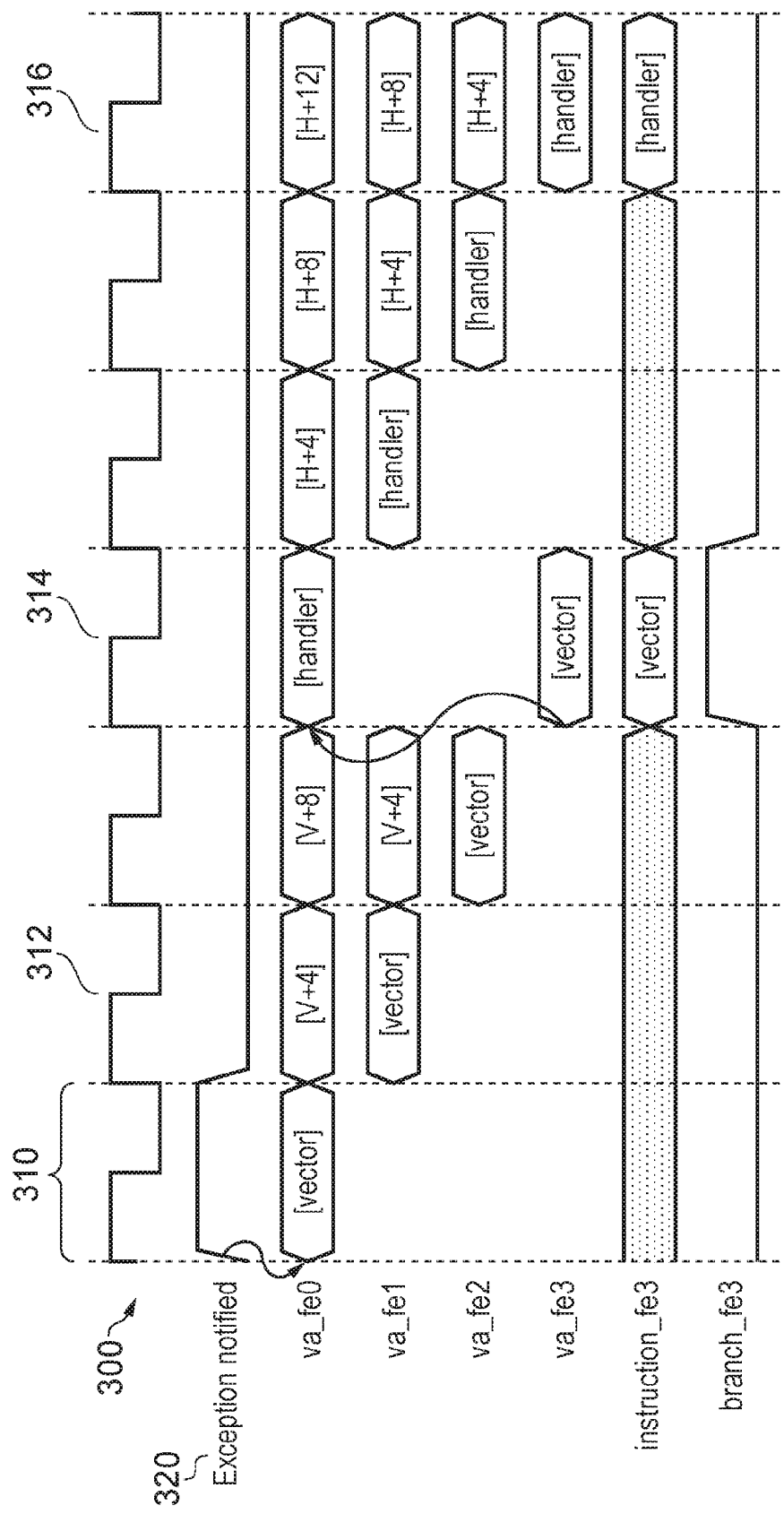
FIG. 3 is a schematic timing diagram illustrating exception handling by the processor system of FIG. 1.

FIG. 3 is a schematic timing diagram illustrating exception handling by the processor system of FIG. 1.

Aspects of the notation used in FIG. 3 will first be discussed. A similar notation is used in other timing diagrams discussed below.

A top line 300 of the diagram represents successive processor clock cycles 310. The four stages of the pipelined instruction pre-fetch unit 60 are represented by successive labels fe0, fe1, fe2 and fe3. At the stage fe0, an instruction address (where addresses are represented by the notation [address], and the instruction at that address is indicated without square brackets) is provided to the first stage of the pre-fetch-unit pipeline. The virtual address (va) present in the pipeline at each pipeline stage fen is referred to as va_fen.

Note that if a next address is not provided by an external device (such as the exception logic 70) or by an internal response to a branch or similar instruction, then the pre-fetch unit simply applies the next-successive instruction address. In the case of addresses represented by 8-bit bytes, and in the example of an instruction fetch bandwidth of 32 bits per cycle, the next instruction address is four bytes higher than the current instruction address.

At the stage fe3, the instruction has been fetched and is passed for decoding (at a stage indicated by instruction_fe3). A signal branch_fe3 indicates whether the instruction at the stage fe3 has been identified as a branch instruction. In the notation used, a high state indicates the presence of a branch instruction. If the current instruction is a branch instruction, then there are two main results: (a) a destination address (as defined or referenced by the branch instruction) is loaded into the first stage of the pipeline for fetching, and (b) any partly-fetched instructions are deleted, which is to say that the pipeline is cleared or flushed.

Finally, a signal 320 schematically represents (by a high state) the notification of an exception by the exception logic.

Looking at the specific operations shown in FIG. 3, an exception is indeed notified in the first clock cycle 310. In response to this, the address ("[vector]") of the appropriate vector (based on the sum of the vector table base address and the offset for that exception type, as discussed above) is loaded into the pre-fetch unit at the stage fe0. The pipeline is flushed.

At a second clock cycle 312, the next instruction address [vector+4] (abbreviated to [V+4] in the diagram) is loaded into the pipeline stage fe0 and the instruction address [vector] continues to be processed along the pipeline.

This process continues until the fourth clock cycle shown, 314, at which time the instruction (vector) at the address [vector] is available for decoding. It is detected that this is a branch instruction to a destination address [handler]. Therefore, as with any branch instruction, the pipeline is flushed and the address [handler] starts to make its way down the pipeline. Instructions for the next-following addresses [H+4], [H+8] and so on start to be fetched.

Note however that the instruction at the address [handler] is in fact the first useful instruction for handling the exception. The branch instruction at [vector] simply changed the program flow but did not contribute in any other way towards resolving or dealing with the exception. The result is that the first handler instruction is not ready for execution until the seventh clock cycle 316 from notification of an exception (that is to say, counting so as to include the clock cycle in which the exception was notified).

In the case of a real-time processor system, the delay incurred on handling an urgent exception such as an IRQ can be very important. A lower delay is desirable.

Figure 4:
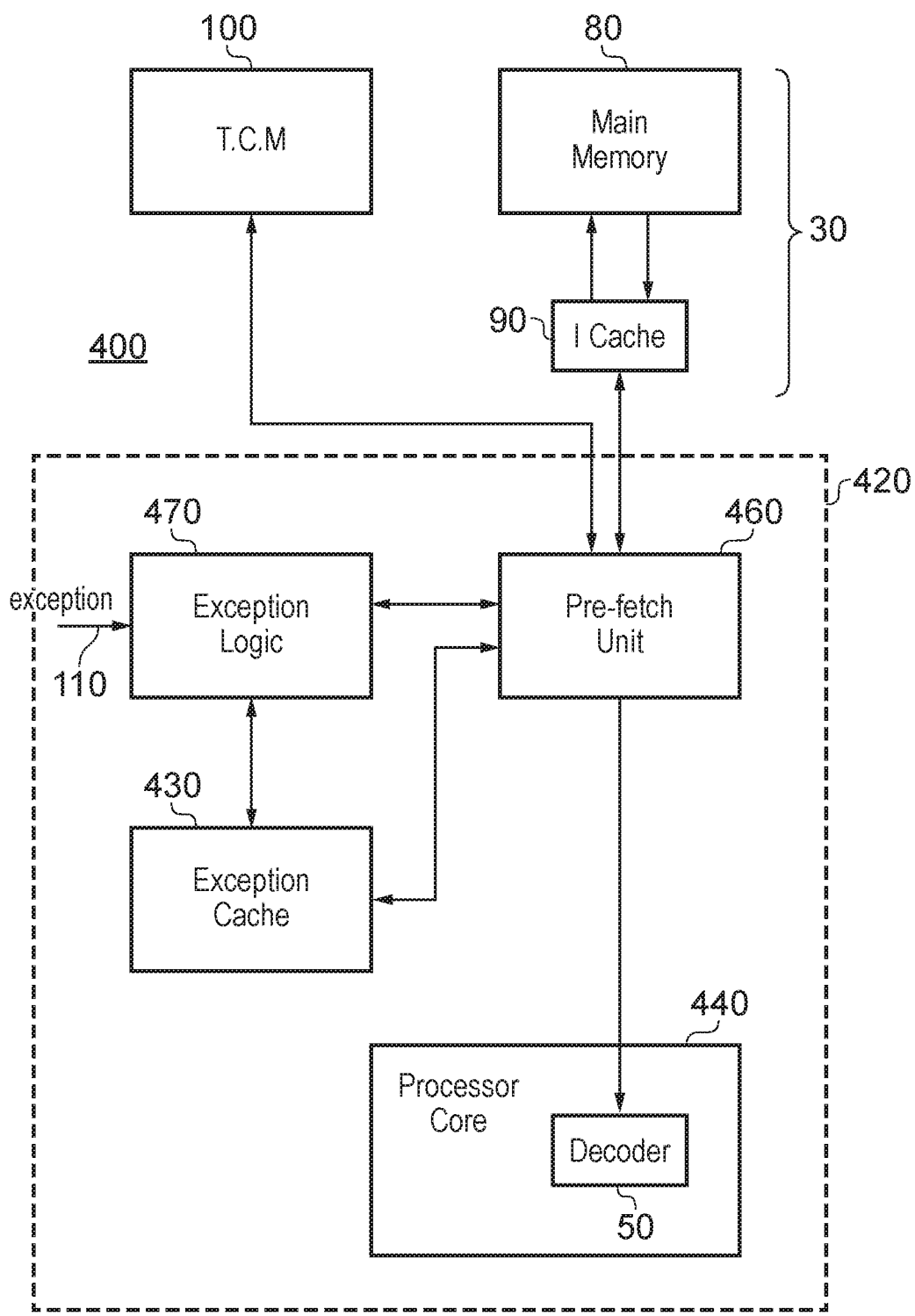
FIG. 4 is a schematic diagram of a processor system according to an embodiment of the present technology.

FIG. 4 is a schematic diagram of a processor system 400 according to an embodiment of the present technology. Note that several components are the same as those shown in FIG. 1 and will not be described further here. Other components are similar and only their differences from the corresponding parts of FIG. 1 will be described.

A significant difference between the arrangements of FIGS. 1 and 4 is the presence of an exception cache 430 associated with the pre-fetch unit 460 and the exception logic 470 in the context of a data processing apparatus 420. Note, as before, that the TCM 100 could form part of the apparatus 420.

In general terms, the exception cache 430 caches information, for at least one of the exception types, relating to execution of the exception instruction, in the vector table, corresponding to that exception type, and to provide the cached information to the processo in response to detection of an exception of that exception type. In an example, the exception cache 430 caches the target or destination address of the branch instruction in the vector table corresponding to at least some exception types. The exception cache 430 can be pre-loaded, for example at processor initialisation, with this information, or (as in the present examples) it can acquire this information at the first occasion that an exception of that exception type is handled. When the same type of exception occurs again after the exception cache 430 has acquired the cached information, then as long as the instruction in the vector table is a branch instruction, the information stored in the exception cache 430 is used to populate the pre-fetch pipeline so as to bring forward the fetching of the first of the handler instructions (the instruction at the address [handler] discussed with reference to FIG. 3).

In these examples, with the exception cache 430 in use, the exception handling response timing is no worse than that shown in FIG. 3 for the first occasion (after processor initialisation) that a particular exception type is handled, but for subsequent occasions the exception handling is potentially quicker than that shown in FIG. 3. An example timing diagram relating to those subsequent occasions will be described below with reference to FIG. 7.

The exception cache 430 also stores one or more flags indicating whether respective data items held by the exception cache 430 are valid. The use of these one or more flags will be discussed further below. But in general terms, the exception cache comprises a flag, associated with each exception type for which the exception cache is configured to cache information, indicating whether the exception cache holds currently valid information for that exception type. The exception cache is configured to provide the cached information to the processor in response to detection of an exception of an exception type only if the respective flag indicates that the cached information is currently valid.

Figure 5:
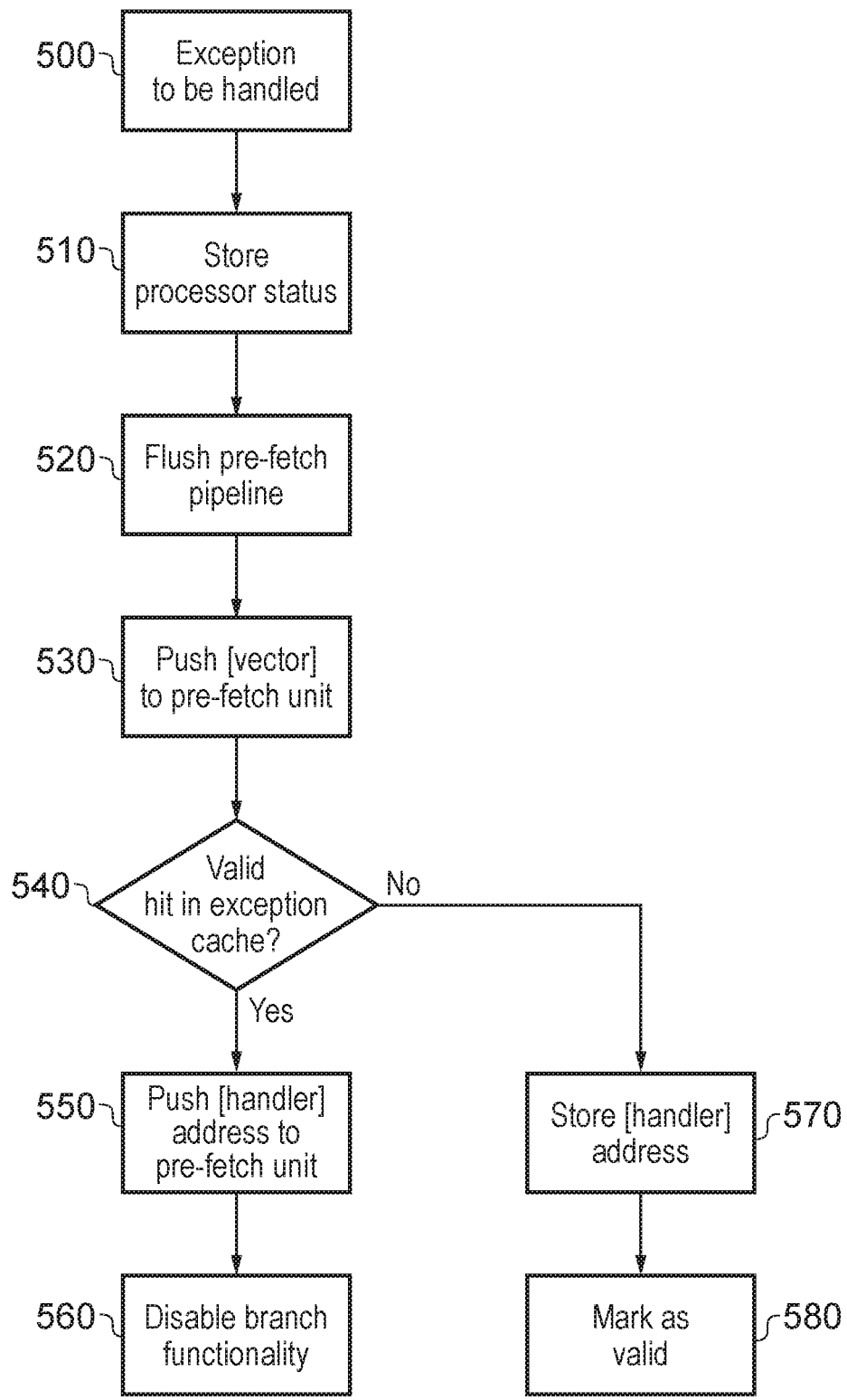
FIG. 5 is a schematic flowchart illustrating an exception handling process performed by the processor system of FIG. 4.

FIG. 5 is a schematic flowchart illustrating an exception handling process performed by the processor system of FIG. 4.

At a step 500, an exception to be handled is notified, for example by the exception signal 110. In general terms, not all exceptions are handled; the different exception types have an order of priority and if an exception type of a higher priority is already being handled, a newly received exception might not be handled. But for the purposes of a description of the step 500, it is assumed that the currently received exception is being handled.

At a step 510 the current processor status is stored. In more detail, the processor core 440 copies the "Current Program Status Register" (CPSR) into the "Saved Program Status Register" (SPSR) for the mode in which the exception is to be handled. This saves the current mode, interrupt mask, and condition flags. The processor core can then change the CPSR to reflect the appropriate execution mode for exception handling and to disable at least some exception types during the handling of the current exception. The return address (for use after the exception handling has been completed) is stored.

The processor core then sets the program counter to the vector address (base address+offset) for the exception. This is handled as a branch of program flow which has the effect of flushing the pre-fetch pipeline at a step 520 and pushing the address [vector] to the pre-fetch unit and onto the pipeline at a step 530.

A step 540 then detects whether the exception cache 430 contains stored information relating to the current exception type and, if so, whether the valid flag associated with that stored information indicates that the stored information is indeed valid. If the answer to both questions is "yes" then control passes to step 550 at which the cached information, in this example the address [handler], is pushed directly to the pre-fetch unit to initiate fetching of the instruction at the address [handler]. As a further step 560, when the instruction at the address [vector] is identified as a branch instruction at the stage fe3, the normal functionality associated with a branch instruction, in particular the flushing of the pipeline, is disabled so as not to flush the early-fetched instructions at the address [handler] and subsequent addresses.

If, at the step 540, the exception cache is found not to hold valid data corresponding to that exception type, then data is stored in the exception cache relating to that exception type. In particular, at a step 570 the address [handler] is stored in the exception cache 430 once it becomes available in the fourth clock cycle after the notification of the exception (that is to say, the clock cycle at which the instruction at the address [vector] is identified), and at a step 580 the valid flag associated with that stored data is marked as "valid". Therefore, in response to an instance of an exception type for which the respective flag indicates that the exception cache does not hold currently valid information, the exception cache is configured: to derive and store information from the execution, by the processor, of the exception instruction; and to set the flag associated with that exception type to indicate that the exception cache holds currently valid information.

Note that the subsequent return from handing an exception involves retrieving processor state information from the SPSR and reinstating it into the CPSR.

Figure 6:
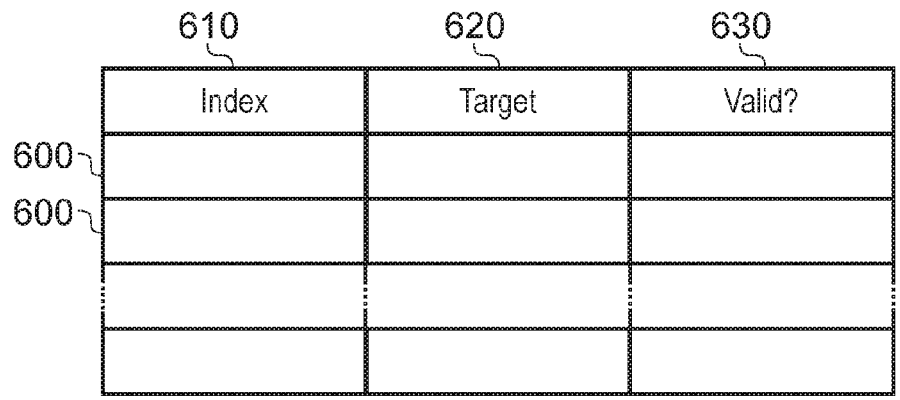
FIG. 6 schematically illustrates a data structure of an exception cache.

FIG. 6 schematically illustrates a data structure of an exception cache of the type discussed above. In FIG. 6, cache entries are shown in rows and columns but this is simply a convenient notation for explanation of the diagram. In the diagram, each entry in the exception cache corresponds to a respective row (as drawn) 600.

Entries in the exception cache 430 are indexed by an index 610. Note however that the use of an explicit and separately identified value "index" is not necessary and is included here just for clarity of explanation. The "index" could be implied by the location, within an ordered memory or a memory having multiple storage addresses, at which the relevant entry is stored. In such instances a separately stored value "index" is not required and would be omitted. To read a required value from such a memory, the "index" is used as some or all of an address to access a relevant row or other section of the exception cache 430. In other words, in some examples, the exception cache 430 can be a direct mapped cache in which each type of exception (of those covered by the caching process) has a dedicated entry.

Various options are available for indexing entries in the exception cache 430. For example, the exception cache 430 could be indexed by the offset value (such as 18h for an IRQ) associated with the exception types. In another alternative, the entries could be indexed by the address [vector]. In a further alternative, however, a simplified indexing scheme is used. In this arrangement, the exception cache stores information relating to only two types of exception: IRQ and FIQ. A two-bit flag is provided to the exception cache 430 by the exception logic 470, for example having the following format (though it will of course be appreciated that the particular order and/or notation used can be varied):

| Flag Bit 1 | Flag Bit 0 |
|---|---|
| 1 = FIQ; 0 = not FIQ | 1 = IRQ; 0 = not IRQ |

An advantage of using such a flag is that the response time of the exception cache 430 can be made quicker, because there is no longer a need for the exception cache 430 to decode either an offset value or an address [vector]. This is an example of an arrangement in which, in response to a detected processing exception, the exception logic is configured to provide to the exception cache at least data defining the exception type of the detected processing exception; and data defining the exception address corresponding to the detected processing exception. In particular, in an arrangement in which the exception cache is configured to cache information only in respect of a subset of the exception types, (such as exception types corresponding to processor interrupts such as IRQ and FIQ) in response to a detected processing exception, the exception logic is configured to provide to the exception cache one or more flags indicating whether the detected processing exception has an exception type in the subset of exception types.

Returning to FIG. 6, for each value of the index 610, the exception cache stores a target address 620, being the address [handler] pointed to by the branch instruction at the address [vector] for that exception type, along with a flag 630 indicating whether the data corresponding to that exception cache entry is valid.

Figure 7:
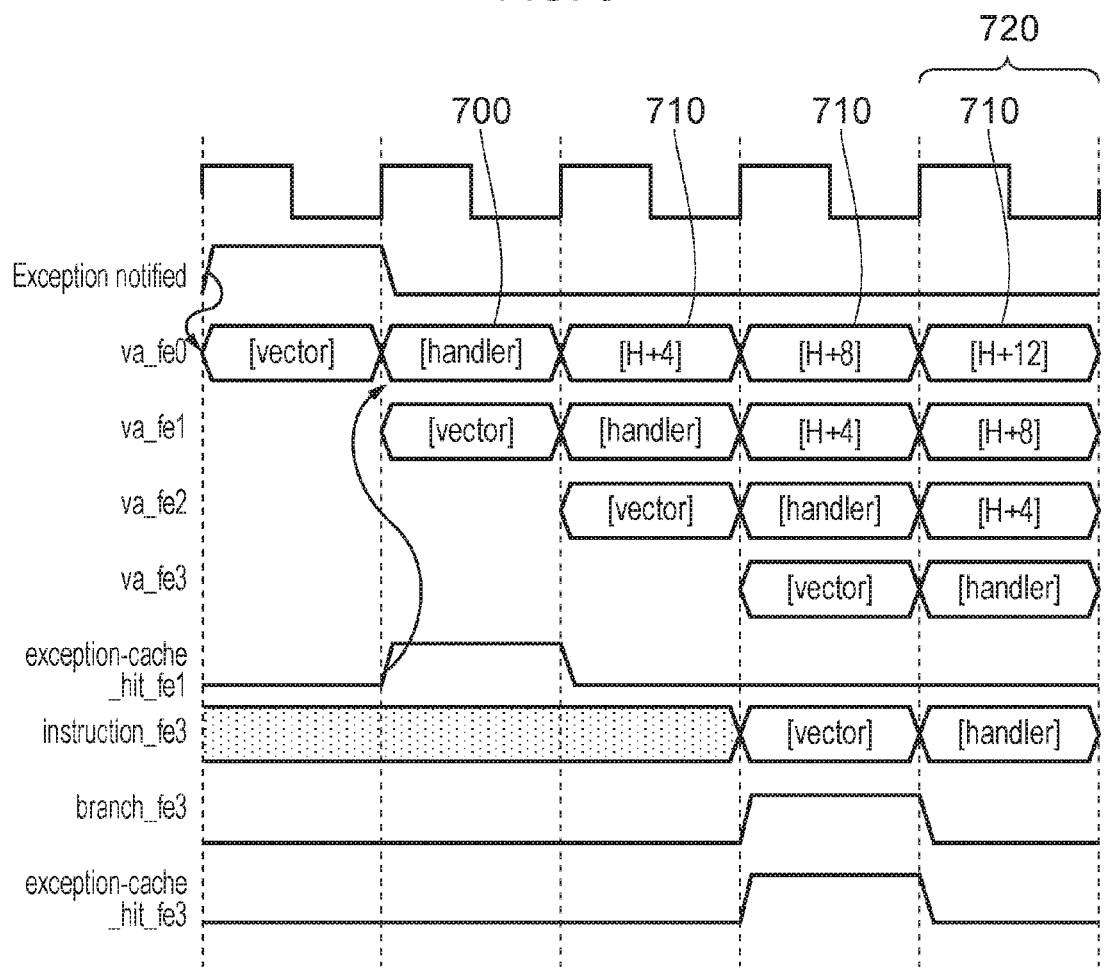
FIG. 7 is a schematic timing diagram illustrating exception handling by the processor system of FIG. 4.

FIG. 7 is a schematic timing diagram illustrating exception handling by the processor system of FIG. 4. The notation used is generally the same as that shown in FIG. 3, and such aspects will not be described again in detail here.

A so-called cache "hit", which is to say a detection of whether the exception cache 430 contains valid information relating to the currently handled exception, is detected in respect of two of the pipeline stages (fe1 and fe3) of the pre-fetch unit. These detections are indicated by the signals exception_cache_hit_fe1 and exception_cache_hit_fe3.

The first of these, exception_cache_hit_fe1, indicates (by a logical high state as drawn) whether a cache hit has occurred in respect of the address [vector] which, in its progress through the pre-fetch pipeline, is currently at the pipeline stage fe1. In the case of such a cache hit, the exception cache 430 provides the target address 620 (in this example, the address [handler]) to the pre-fetch unit to be inserted into the pre-fetch pipeline as a next address 700 for fetching.

The signal exception_cache_hit_fe3 indicates (by a logical high state as drawn) that a cache hit has been detected in respect of the address [vector] which has reached the final stage fe3 of the pre-fetch pipeline. Given that the instruction at the address [vector] is a branch instruction, the signal exception_cache_hit_fe3 is used to inhibit the normal operation in response to a branch instruction. In particular, the signal exception_cache_hit_fe3 inhibits or prevents (a) the flushing of the pre-fetch pipeline in response to the branch instruction, and (b) the insertion of the branch target address into the start of the pre-fetch pipeline. Taken together, these measures allow the fetching of the instructions at addresses 710 following the original target address [handler], that is to say the instructions at [H+4], [H+8],[H+12] . . . to continue.

Comparing FIG. 7 with the FIG. 3, it can be seen that the first useful instruction of the exception handler is available for execution at the fifth clock cycle 720 from the notification of the exception, which is two clock cycles sooner than the comparable situation in FIG. 3.

Figure 8:
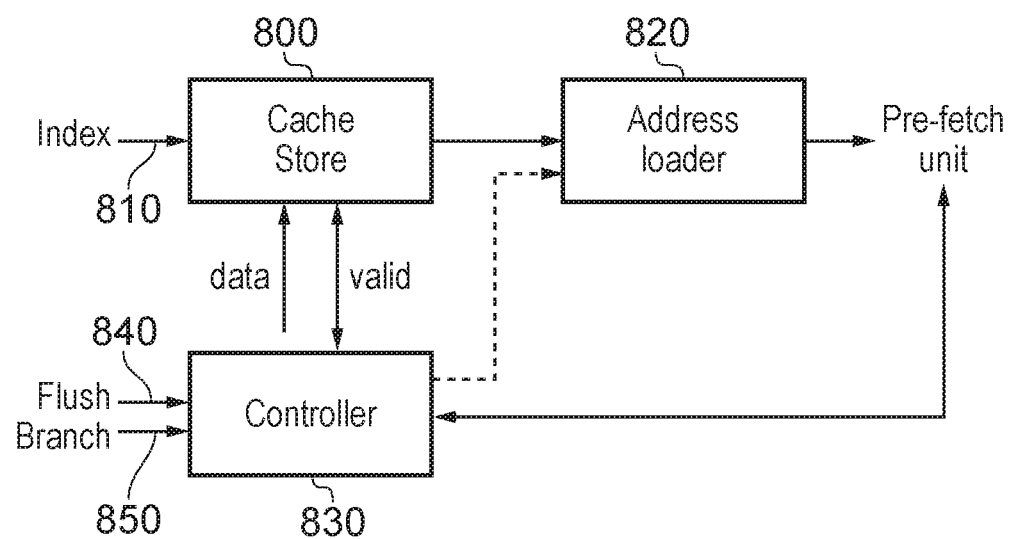
FIG. 8 provides a schematic overview of an exception cache.

FIG. 8 provides a schematic overview of an exception cache as an example of an exception cache configured to cache information, for at least one of a plurality of possible processing exception types of a processor, relating to execution of the exception instruction by the processor at an exception address corresponding to that exception type and to provide the cached information to the processor in response to detection of an exception of that exception type, the exception cache comprising a flag, associated with each exception type for which the exception cache is configured to cache information, indicating whether the exception cache holds currently valid information for that exception type. The exception cache is configured to provide the cached information to the processor in response to detection of an exception of an exception type only if the respective flag indicates that the cached information is currently valid.

A cache store 800 holds data of the form described with reference to FIG. 6 and an appropriate data item (a row as drawn in FIG. 6) is accessed in response to an index 810, for example a two-bit flag of the type discussed above. The cache store 800 passes the target address 620 for the currently indexed row to an address loader 820 which, under the control of a controller 830, supplies the cached target address to the pre-fetch unit. This takes place if the valid flag 630 associated with that indexed row indicates that the cached target address is indeed valid; the controller 830 detects the state of the valid flag and controls operation of the address loader. If the valid flag indicates that the currently cached data is not valid, then the controller 830 acts as described in the steps 570, 580 of FIG. 5 to obtain data for caching in the cache store 800 from the pre-fetch unit in respect of the currently fetched instruction.

The controller 830 receives other inputs, two of which are shown schematically in FIG. 8, namely a flush signal 840 and a branch signal 850.

In response to the flush signal, which will be described further below, the controller 830 sets the valid flags associated with all of the data stored in the cache store 800 to a state indicating "invalid".

The branch signal is relevant to the steps 570, 580 of FIG. 5, namely the process of loading data into the cache store 800. A constraint is imposed such that information is cached only in respect of the instruction at an address [vector] if that instruction is an unconditional direct branch instruction, which is to say an unconditional branch instruction which does not depend on references to an external register to determine the branch target address. Accordingly, if the branch signal 850 indicates that the currently decoded instruction is not an unconditional direct branch instruction, the controller 830 does not cause information relating to execution of that instruction to be stored in the cache store 800 (or, as an alternative, the information can be stored but the valid flag is not net to a state indicating that valid data is stored).

Figure 9:
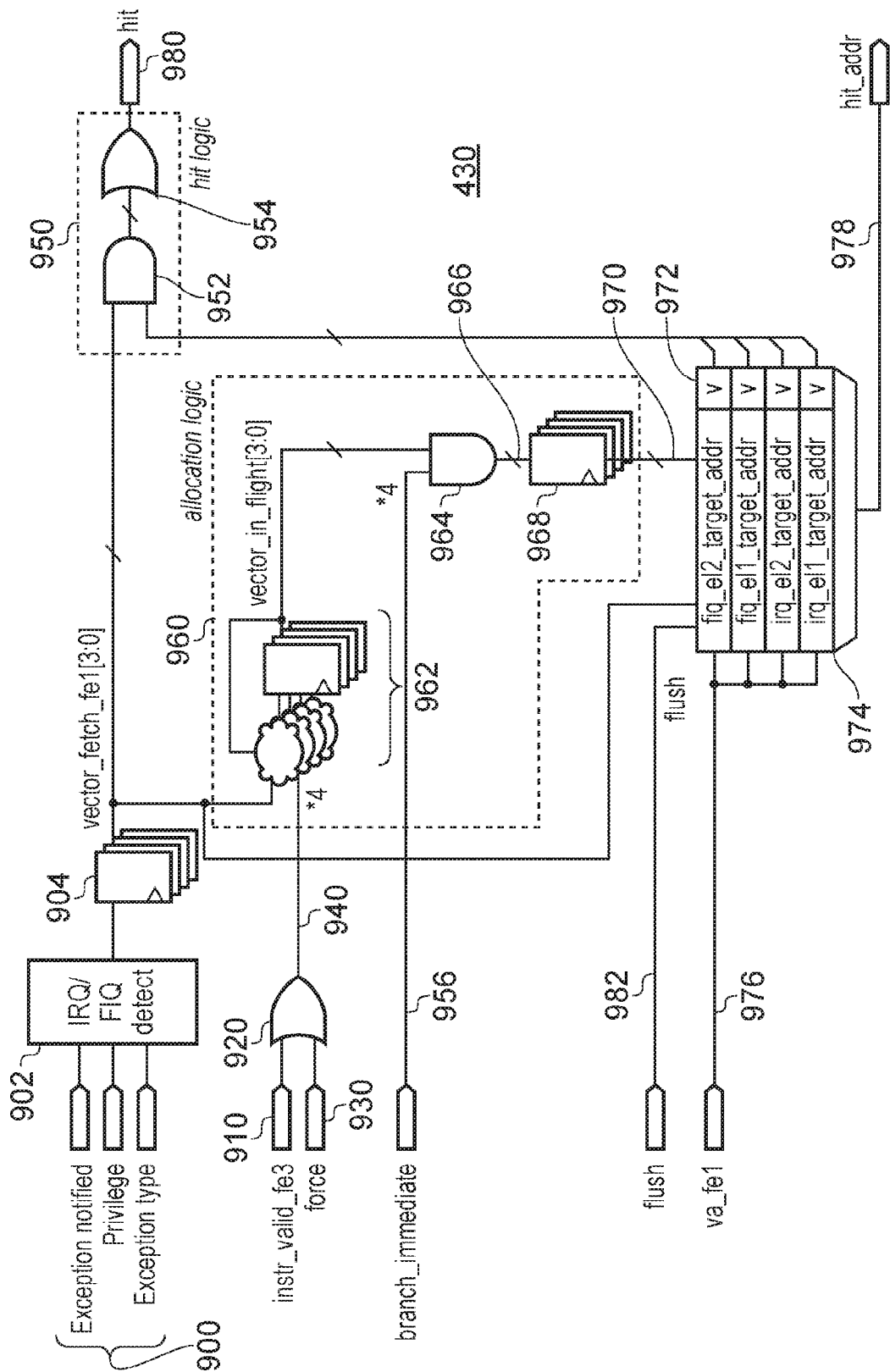
FIG. 9 is a detailed schematic diagram of an exception cache.

FIG. 9 is a detailed schematic diagram of an exception cache 430. The exception cache receives signals 900 from the exception logic comprising an "exception notified" signal and a two-bit flag (forming the index 810 discussed above) which, in this example, comprises one bit each to indicate whether the exception is an IRQ or an FIQ. Further information indicating an exception execution privilege (EL1 or EL2 in this example) can also be included. An IRQ/FIQ detector 902 responds to this information and data provided to the exception cache defining an execution privilege relating to the detected processing exception, to demultiplex this flag and the privilege data into four indicator bits:

one bit indicating an IRQ at EL1
one bit indicating an FIQ at EL1
one bit indicating an IRQ at EL2
one bit indicating an FIQ at EL2

Here, the acronym "EL" signifies an exception level, which relates to a level of processor privilege and will be discussed further below. For now, it is noted that in some examples, separate vectors are provided for IRQs and FIQs at different exception levels. However, in other examples, a single indication of an IRQ and a single indication of an FIQ could be used.

These indicator bits are used in relation to an exception cache configured to cache information in respect of each of a set of two or more execution privileges.

The four indicator bits are delayed for one clock cycle by a flip flop 904 (in fact four respective flip flops, one for each bit) so as to provide a four bit output vector_fetch_fe1. Note that this signal is asserted one clock cycle later than the clock cycle in which the exception is notified (and in which the exception vector was placed into the stage fe0 of the pre-fetch pipeline), and so this signal now indicates that the exception vector is at the stage fe1 of the pre-fetch pipeline. The signal vector_fetch_fe1 is supplied to hit logic 950 and to allocation logic 960.

The hit logic 950 is configured to provide an output "hit" 980 which is asserted if there is a cache hit in the exception cache, which is to say that the currently processed exception has valid data stored in the exception cache. To achieve this, the hit logic comprises a logical AND gate 952 which combines bits from the vector_fetch_fe1 signal with respective valid flags 972 indicating a valid data entry for that type of exception. A logical OR gate 954 combines the four outputs of the AND gate 952 into a single output 980, so that the hit output is asserted if any of the four indicator bits is set and the corresponding cache entry has a valid flag set.

The hit output 980 is therefore available one clock cycle after the notification of the exception and indicates that a cache hit has been obtained in respect of that exception type. At the time at which the hit output 980 is asserted, it forms the exception_cache_hit_fe1 signal referred to in FIG. 7. This signal propagates through the fetch pipeline to form the exception_cache_hit_fe3 signal two cycles later. As discussed above, it is used, at least in part, to indicate to the processor core and the pre-fetch unit that (a) (as regards exception_cache_hit_fe1) a new address obtained from the exception cache should be loaded into the stage fe0 of the pre-fetch unit, and (b) (as regards exception_cache_hit_fe3) the normal operations in response to a branch instruction, namely flushing the pre-fetch pipeline and loading a branch address into the stage fe0, should be inhibited. In other words, the exception cache is configured, in an instance in which the exception cache has provided a cached branch target address to the processor, to inhibit an operation of the processor in response to a branch instruction to delete any instructions currently being fetched by the pipelined instruction fetching unit.

The new address, hit_addr (978), is obtained from a data store 974 indexed by the vector_fetch_fe1 signal 904. The stored address corresponding to that exception is output as hit_addr, for loading into the stage fe0 of the pre-fetch pipeline if the "hit" signal (acting as exception_cache_hit_fe1) is asserted, and the associated valid flag 972 is supplied to the hit logic 950.

In the case of a cache miss an address va_fe1 (976) is written into the data store, this address representing the target address of the branch instruction at the exception vector.

A flush input 982 instructs the data store 974 to clear the valid flags 972. Flushing will be discussed in more detail below.

A mechanism for storing a branch address in the data store 974, in an instance in which a valid branch address is not currently stored, will now be described.

As an overview, the write operation is initiated by the vector_fetch_fe1 signal when the exception cache does not store a valid entry for the currently handled exception type. A write operation is caused to complete by a branch_immediate signal indicating that a branch immediate instruction is detected. A pending write operation is cancelled or aborted by the assertion of either an instr_valid_fe3 signal 910 or a force signal 930 before the branch_immediate signal is detected.

The process will now be discussed in more detail.

The instr_valid_fe3 input 910 indicates (from the pre-fetch unit) whether a valid instruction (of any type) is detected at the fe3 stage of the fetch pipeline. Note that after an exception the instr_valid_fe3 signal is cleared because the pipeline is flushed; it is asserted again when the first instruction following an exception, which is the exception instruction in the vector table, has reached the fe3 stage. The significance of the instr_valid_fe3 signal to the present discussion is that if it asserted during the handling of an exception but before a branch_immediate instruction is detected, it can indicate that there was an instruction in the vector table which was not a branch, and so a write operation to the data store of a branch address should be aborted. This input 910 is combined by a logical OR gate 920 with a force signal 930, which is asserted for any kind of event where the prefetch unit is sent to a different address stream, including exceptions. The significance of this signal to the present discussion is that if it is asserted while an exception is being handled, it indicates that a higher priority exception (or other event) is notified during the processing of a first exception (which in turn forms a reason to cancel writing of a branch target address to the data store because it may no longer relate to the first exception).

A further input 956 indicates that a branch_immediate instruction has been detected at the pipeline stage fe3. If a branch_immediate instruction is not indicated, then a valid entry is not written to the exception cache. In other words, the exception cache is configured to cache information only in respect of instances in which the exception instruction is a branch instruction (such as an unconditional branch instruction); the cached information comprises an address dependent upon a branch target of that branch instruction; and the instruction fetching unit is configured to initiate fetching of an instruction at the branch target address in response to receipt of the cached information from the exception cache. If a branch_immediate instruction is detected, then assuming that a write operation to the data store has been initiated but has not been cancelled, the write operation is enabled to the data store on the next clock cycle.

The logical OR combination of the inputs 910, 930 provides a signal 940 which, if it is asserted before the branch_immediate signal is asserted, indicates that a write operation to the data store should be aborted. The reasoning behind this is as discussed above. If the instr_valid_fe3 signal is asserted before the branch_immediate signal is asserted, this indicates that the vector table contained an instruction other than a branch. If the force signal is asserted before the branch_immediate signal is asserted, this indicates that program flow has been diverted again, for example by a higher priority exception. In either instance, a write operation to the data store (which has already been initiated) is aborted.

The output 940 of the OR gate 920 is combined with the signal vector_fetch_fe1 by a latch arrangement 962 such that a latch output signal vector_in_flight is asserted when the signal vector_fetch_fe1 is first asserted and stays asserted until the branch instruction (corresponding to the vector table entry for the currently handled exception) reaches the fe3 pipeline stage, unless the signal 940 (representing the OR combination of the signals 910, 930) is asserted in the meantime.

The signal vector_in_flight and the branch_immediate signal are combined by a logical AND gate 964 to generate an output 966 indicating that a branch instruction relating to an exception has passed through the pre-fetch pipeline for execution, and a data write operation has not been aborted by the mechanism described above. The signal 966 is delayed by one clock cycle by flip flops 968 to provide an enable signal 970 which causes a respective valid flag 972 associated with that interrupt type and exception level to be set to "valid" one clock cycle later. The enable signal also causes the data store 974 to store the address va_fe1 in the respective entry of the data store 974.

Figure 10:
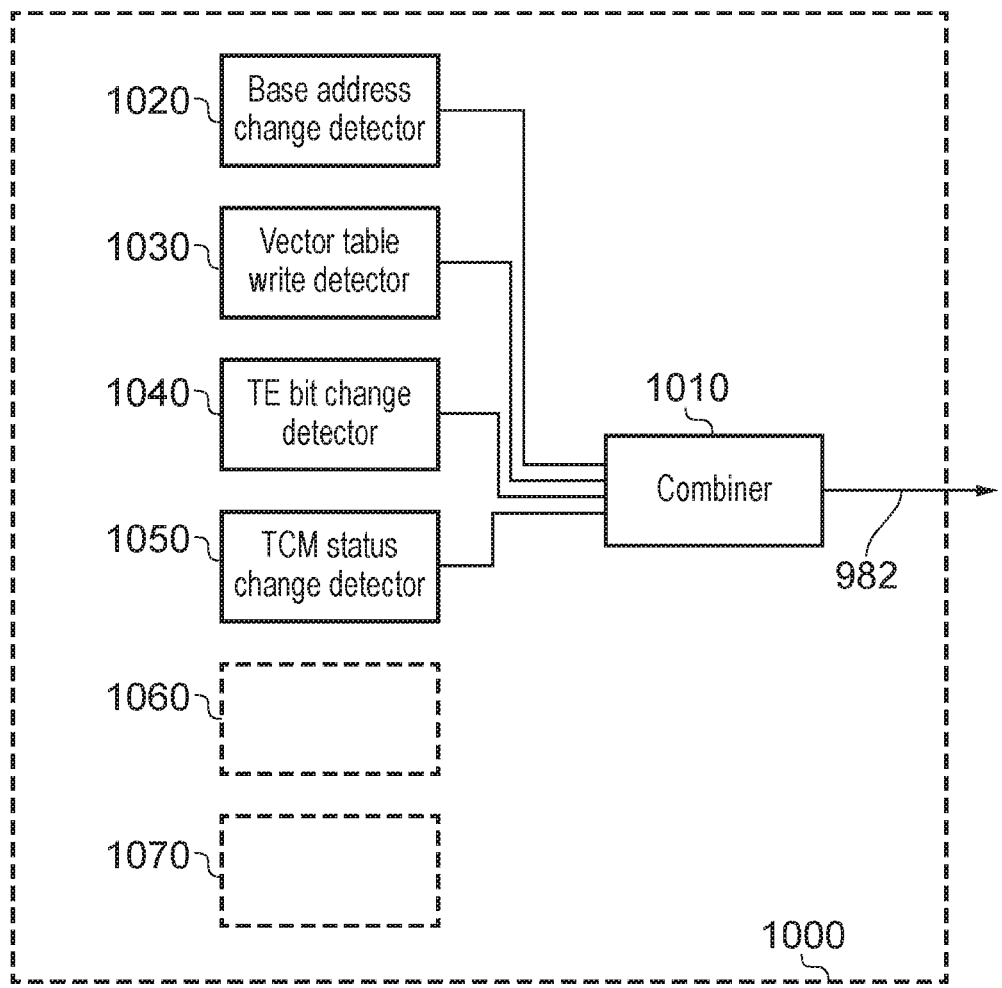
FIG. 10 schematically illustrates a cache flush controller.

FIG. 10 schematically illustrates a cache flush controller 1000, which schematically represents a part of the functionality of at least the processor core 440 and/or the exception logic 470 to generate the flush signal 982 discussed above. In general terms, a flush of the exception cache may be triggered by various different causes; in the schematic arrangement of FIG. 10, a combiner 1010 (such as a logical OR gate) asserts the flush signal 982 if any one (or more) of those causes is applicable.

In general terms, the cache flush controller is configured to detect an instance of a circumstance relating to one or more of the exception instructions, the circumstance being selected from the list consisting of: a change of one or more of the exception addresses (for example, a vector address and/or a handler address); a change of an instruction type of one or more of the exception instructions; a write operation in respect of a memory address in a memory region including one or more of the exception addresses; a change in memory type of a memory region including one or more of the exception addresses; and a mismatch between cached information relating to a currently handled exception and actual information relating to the currently handled exception; and, in response to such a detection, to set at least some of the flags to indicate that the exception cache does not hold currently valid information.

Examples of the detection of various causes of a flush operation are as follows.

A base address change detector 1020 detects a change in the register 210 holding the base address of the vector table. If a change is detected, then a signal to the combiner 1010 is asserted so as to trigger a cache flush operation.

A vector table write detector 1030 detects a write operation to the vector table (or, for simpler implementation, to a memory region such as a four kilobyte region encompassing the vector table). If a write operation is detected, then a signal to the combiner 1010 is asserted so as to trigger a cache flush operation.

A TE bit change detector 1040 detects a change in the so-called TE bit, or a functionally similar indicator, which indicates the type of instruction set in use for exception instructions from a set of two or more possible instruction sets. If a change in instruction set for exception instructions is detected, then a signal to the combiner 1010 is asserted so as to trigger a cache flush operation.

A TCM status change detector 1050 detects a change in the address mapping or current operational status of the tightly coupled memory (TCM) 100. As well as merely detecting any change, the TCM status change detector 1050 can also (or instead) be arranged so as to detect a situation in which the vector table is not located within the TCM. In any of these instances. a signal to the combiner 1010 is asserted so as to trigger a cache flush operation.

Further detectors 1060. 1070 may also be used to provide respective signal o the combiner 1010.

As mentioned above, the combiner asserts the flush signal 982 in response to any one of its input signals being asserted.

In the present examples, the whole of the exception cache is flushed if the flush signal is asserted, which is to say that all of the valid flags 972 are set to a state indicating "invalid". However, in other examples, an arrangement could be provided by which only certain ones of the valid flags were set to "invalid" in response to particular types of cause of a flush operation.

Figure 11:
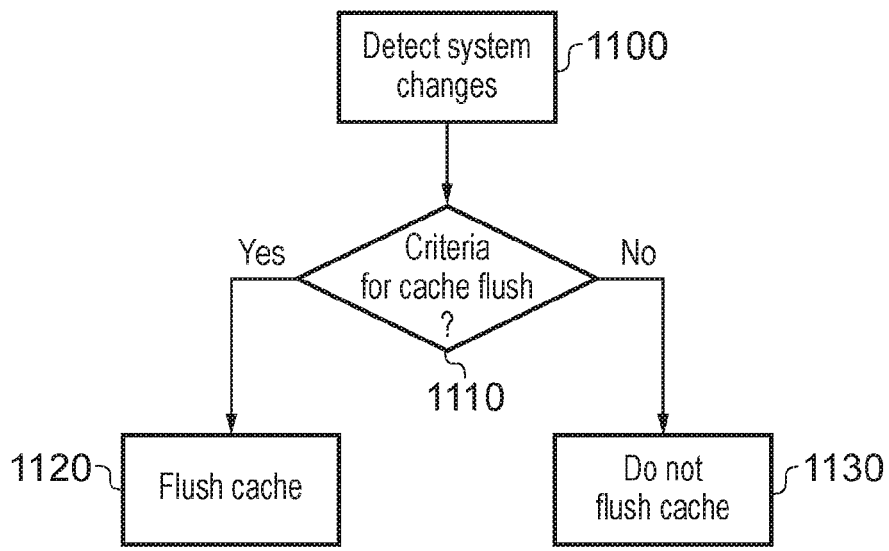
FIG. 11 is a schematic flowchart illustrating a flush operation.

FIG. 11 is a schematic flowchart illustrating a flush operation.

At a step 1100, the exception cache detects one or more system changes of the type discussed above with reference to FIG. 10. At step 1110, the exception cache detects whether a detected system change meets one of the criteria for flushing the exception cache. If the answer is yes, then at a step 1120 the exception cache is flushed. If not, then at a step 1130 the exception cache is not flushed.

Other aspects of flushing operations are discussed below with reference to FIGS. 21-22.

Figure 12:
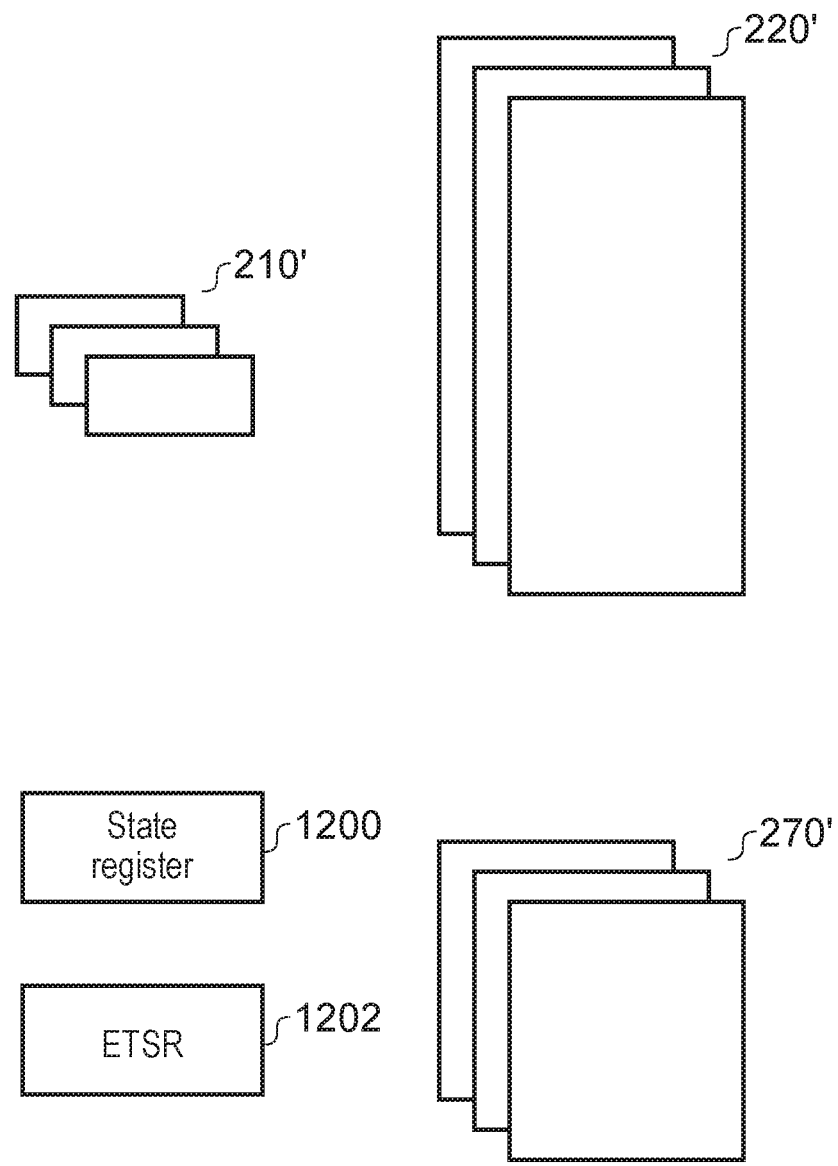
FIG. 12 schematically illustrates an exception handling process in the context of multiple exception levels.

FIG. 12 schematically illustrates an exception handling process in the context of multiple exception levels. A state register 1200 stores a current execution state or privilege level, and an exception target state register (ETSR) 1202 stores an execution state or privilege relating to exception instructions. Depending on the information stored in the state register 1200 and the information stored in the ETSR 1202, a respective one of a set of base address registers 210' is accessed in response to an exception, which in turn points to a respective one of a set of vector tables 220', pointing to respective handlers 270'

Figure 13:
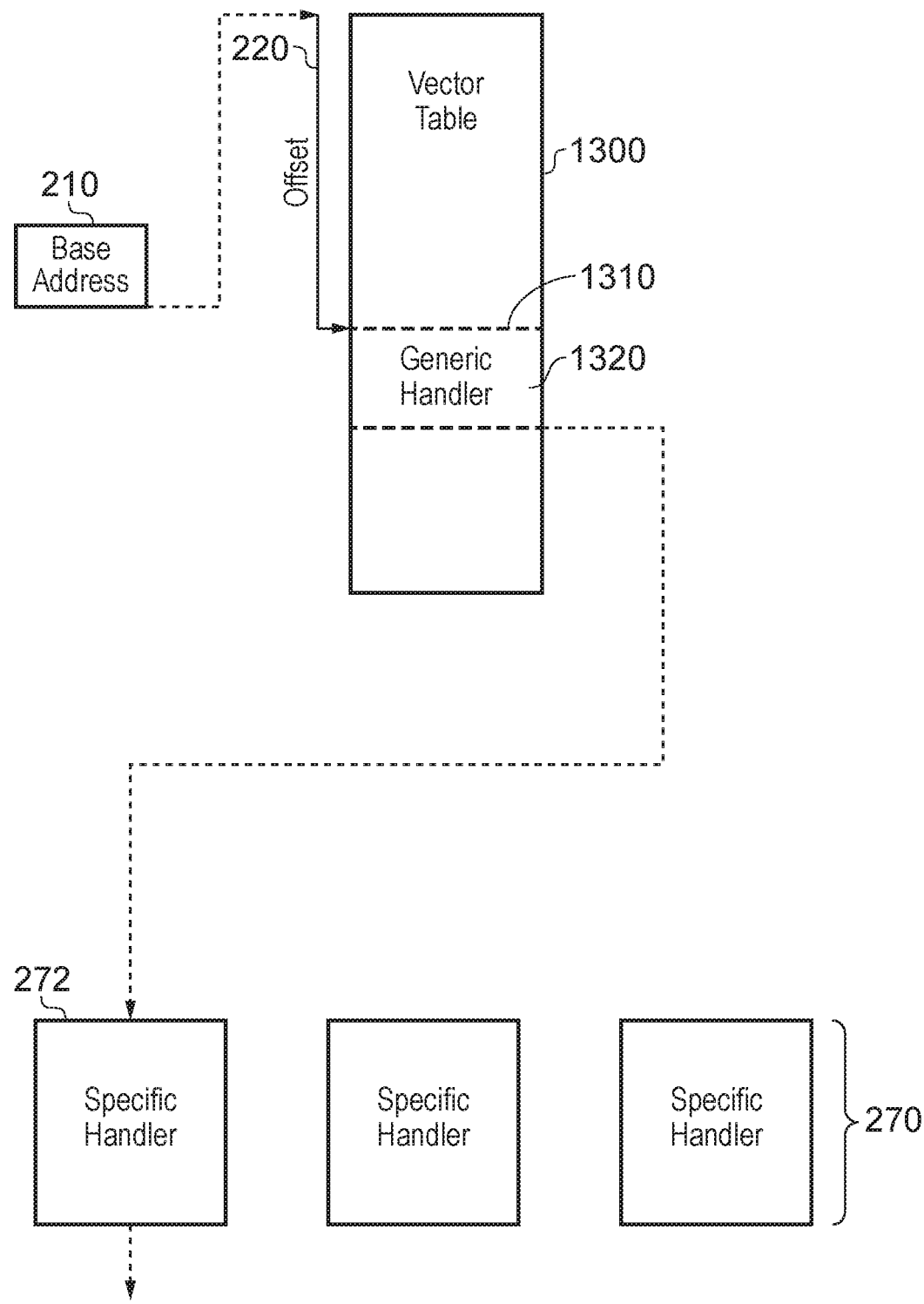
FIG. 13 schematically illustrates another example of an exception handling process.

FIG. 13 schematically illustrates another example of an exception handling process. The arrangement is similar in some ways to that shown in FIG. 2, in that a base address held in a register 210 and relating to the position in the memory space of a vector table 1300 and an offset 220 relating to the particular exception type which has been notified combine to give a position or address 1310 within the vector table 1300. In contrast to the vector table 200 of FIG. 2, however, the address 1310 represents the start of a program code routine 1320 rather than simply providing a branch instruction to divert program flow to a generic handler. In this arrangement, the functionality of the generic handler can be provided by the program code routine 1320 such that the program code routine 1320 then diverts program flow to an appropriate one (272) of the specific handlers 270. This arrangement has the advantage (compared to that of FIG. 2) of avoiding one level of branch instruction, but this is at the expense of maintaining a significantly larger vector table 1300.

Figure 14:
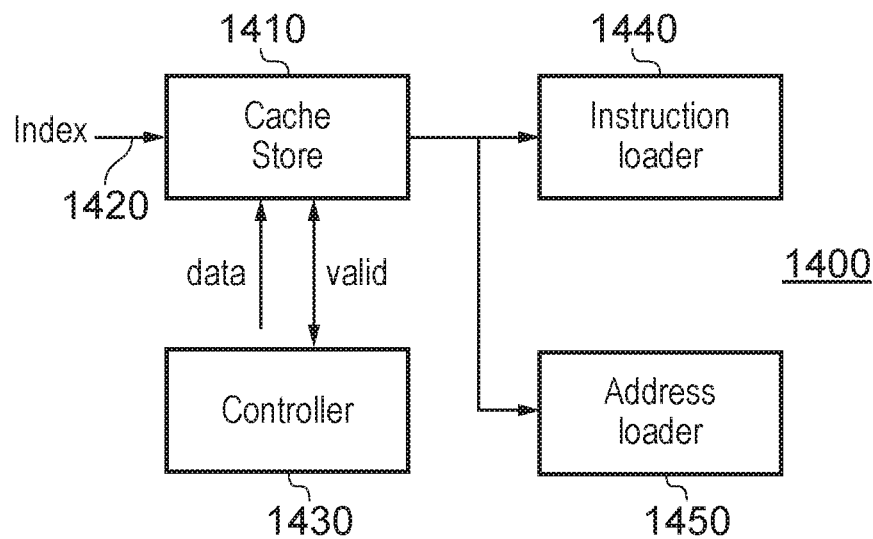
FIG. 14 schematically illustrates another example of an exception cache.

FIG. 14 schematically illustrates another example of an exception cache 1400 which, for example, is suited for use with the arrangement of FIG. 13. The exception cache 1400 is also suitable in at least some instances for use with the arrangement of FIG. 2, particularly in case (ii) mentioned below.

The difference between the exception cache 1400 and the exception cache of FIG. 8 described above is that the exception cache 1400 provides one or more cached instructions (or at least a representation of one or more instructions to be executed by the processor system in response to the processing exception) rather than simply providing a target address. For example, the one or more instructions comprise instructions selected from the list consisting of: (i) one or more instructions starting from the exception address; and (ii) one or more instructions starting from a branch target address of a branch instruction at the exception address. Both of these provide examples of information relating to the execution of the exception instruction at the exception address.

The way in which this arrangement operates will be discussed in more detail below.

A cache store 1410 is indexed by an index signal 1420 to select one of a set of one or more cache entries each having an associated valid flag. Under the control of a controller 1430, if the valid flag is set to indicate that the stored data is valid, the cache store provides one or more next instructions to an instruction loader 1440 which in turn provides those instructions for execution by the processor core. An address loader 1450 provides, to the pre-fetch unit, a next address to be fetched. Again, this operation will be discussed in further detail below.

Figure 15:
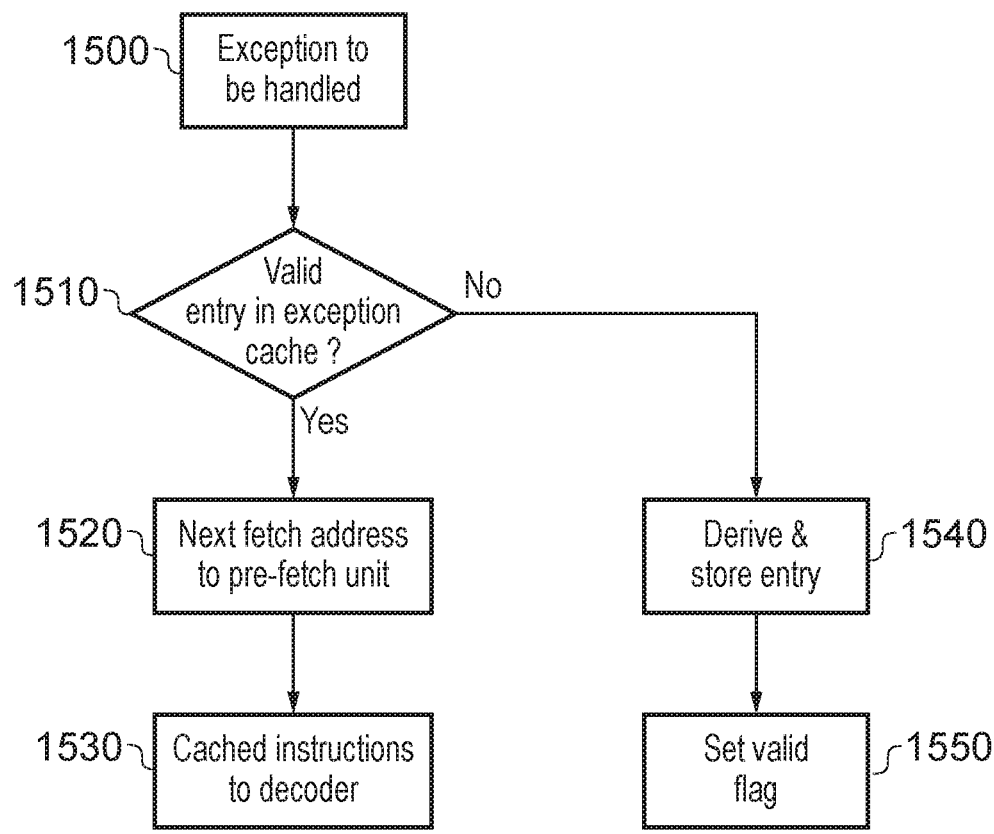
FIG. 15 is a schematic flowchart illustrating the operation of the exception cache of FIG. 14.

FIG. 15 is a schematic flowchart illustrating the operation of the exception cache of FIG. 14. At a step 1500, an exception to be handled is notified. A step 1510 detects whether a valid entry relating to that exception type is held by the cache store 1410. If the answer is yes then control passes to a step 1520 at which a next fetch address is supplied to the pre-fetch unit, and at a step 1530, one or more cached instructions are supplied to the processor core, for example to the decoder. If, however, at the step 1510 the answer was no, then at step 1540 the exception cache derives and stores a cache entry in the cache store 1410 and at a step 1550, sets the valid flag associated with that entry to indicate validity.

Figure 16:
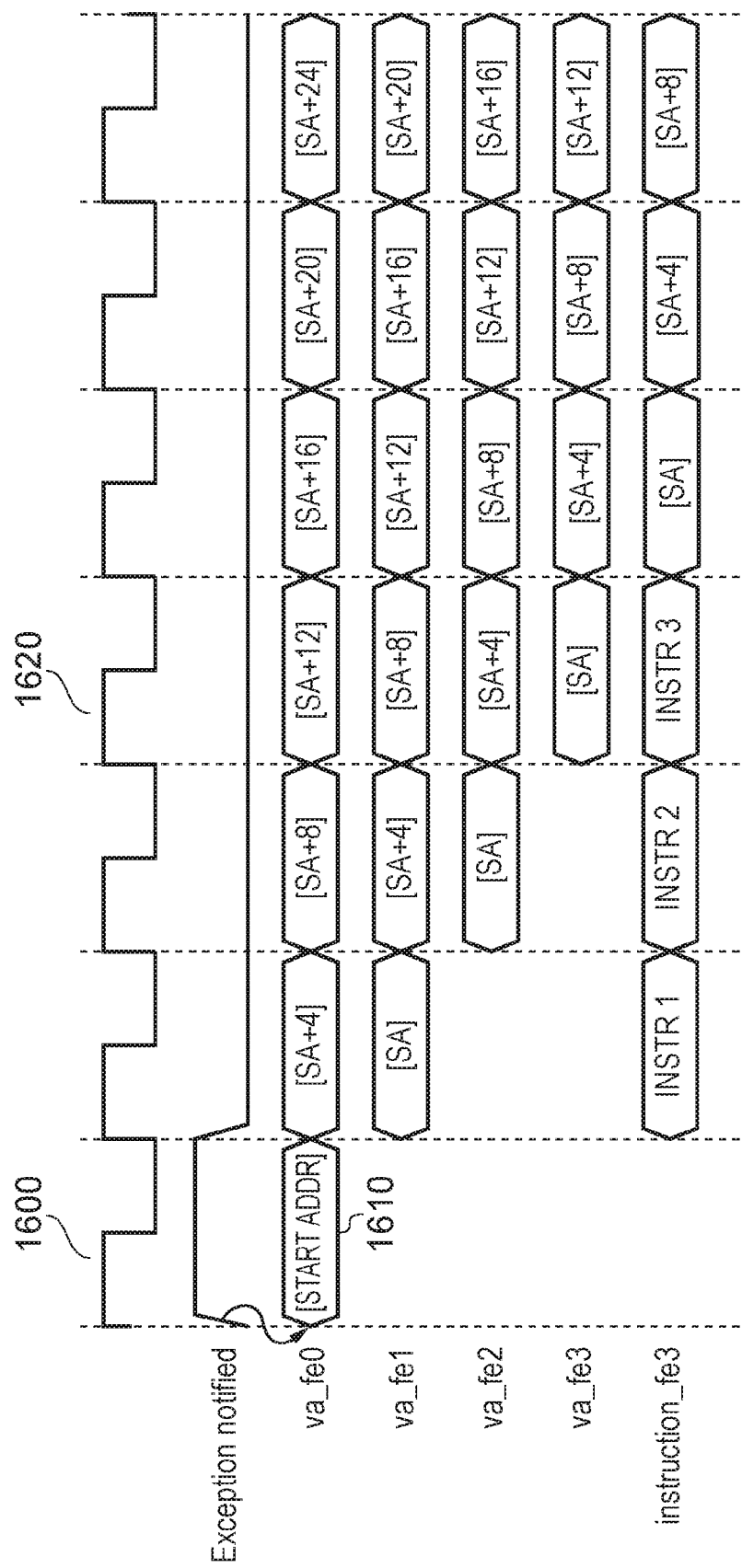
FIG. 16 is a schematic timing diagram relating to the operation of the exception cache of FIG. 14.

FIG. 16 is a schematic timing diagram relating to the operation of the exception cache of FIG. 14.

As before, an exception is notified in a first clock cycle 1600. In response to this, the exception cache immediately provides an address 1610 as a next address (va_fe0) to be fetched to the initial stage of the pipelined pre-fetch unit. This address is referred to in FIG. 16 as [start addr], abbreviated to [SA].

As well as providing the start address, the exception cache also provides a set of cached instructions, referred to in FIG. 16 as "Instr 1", "Instr 2" and "Instr 3". For example, these may represent the first three instructions of the program code routine 1320. But in other examples, for instance in a situation where the exception cache 1400 is used in the context of the arrangement of FIG. 2, the cached instructions could be the first three instructions of the generic handler 260. In such a case, the branch instruction from the vector table need not be cached, and the branch operation either handled without caching or using the vector caching arrangement discussed above.

Once the third of the cached instructions, Instr 3, has been executed at a clock cycle 1620, the pipelined pre-fetch structure means that the instruction at the address [SA] is available for decoding and execution.

This therefore affects how the address [SA] is derived or provided. The address [SA] is not in fact the address of the first instruction in the program code routine 1320, but rather the address of the instruction which follows the set of cached instructions held by the exception cache 1400. In the present example, the address [SA] is therefore equal to the base address held in the register 210, plus the offset 220, plus 12 (for the three cached 32-bit instructions). But it will be appreciated that more generally the address [SA] can be equal to the initial address of the code routine 1320 plus the length of the cached instructions. In other words, the exception cache is configured to provide to the instruction fetching unit a next address for instruction fetching, the next address being an instruction address following, in the program flow, a last one of the instructions for which the exception cache provides representations to the processor. and which is executed by the processor.

Note that in the example shown, the cached instructions are provided to the processor as instruction_fe3.

Various options are available for providing or deriving the address [SA], being the next address to be fetched. FIGS. 17-20 discuss two such options.

Figure 17:
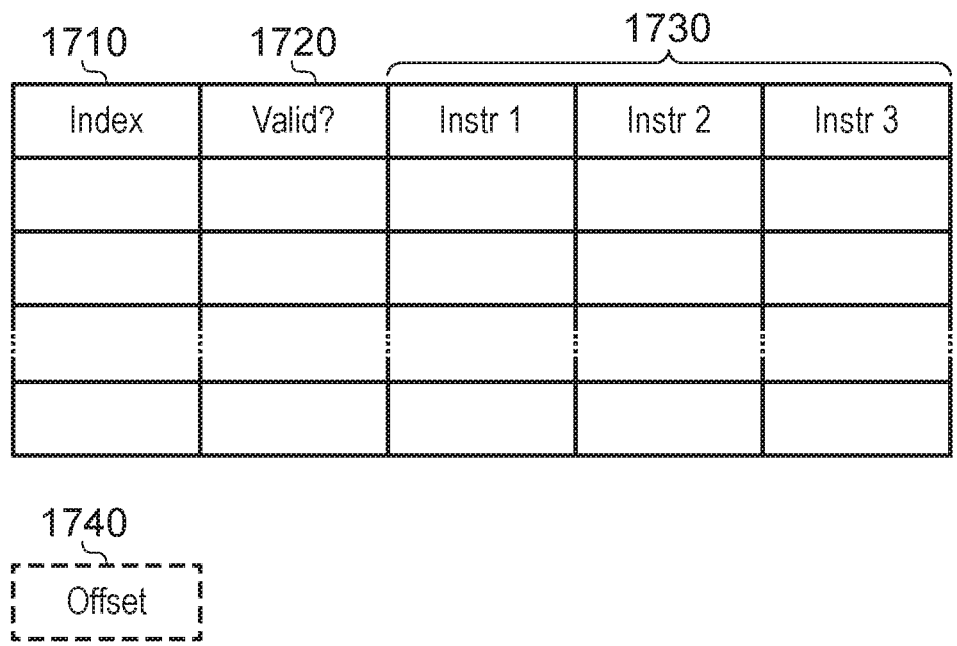
FIG. 17 schematically illustrates a data structure of the exception cache of FIG. 14.

FIG. 17 schematically illustrates an example data structure of the exception cache of FIG. 14, in which each cache entry (illustrated schematically as a row in FIG. 17) is addressed by an index 1710 (which may be stored explicitly or, as discussed above, may instead be implied by an address used to access the exception cache) and comprises a valid flag 1720 and a set of cached instructions 1730. In this example, three instructions are cached for each entry, but it will be appreciated that an appropriate number of instructions can depend upon the length of the pre-fetch pipeline along with the latency, after an exception has been notified, required to provide the first of the cached instructions to the decoder. In the present example, the pre-fetch pipeline is a four stage pipeline and the first of the cached instructions is provided in the clock cycle following the clock cycle in which the exception is notified. So, three cached instructions are sufficient. Note that it would be possible to cache fewer instructions, leading to a delay between execution of the last of the cached instructions and fetching of the first instruction at the address [SA]. Similarly, it would be possible to cache more instructions than are required, but this would be a potential waste of cache space. However, an advantage of storing more instructions is that this can reduce the number of memory accesses required following an exception. If the instructions were coming from an instruction cache rather than a TCM, then this measure could also further improve latency by avoiding potential instruction cache misses on the first few instructions of the handler.

In the example of FIG. 17, the exception cache does not store the start address [SA] but either stores an offset value 1740 or provides logic to derive the offset value 1740 from the number of cached instructions. In the present example, the offset value is 12 (the stored length of three instructions) such that the address [SA] is derived when required from the exception vector address (the start address of the open code routine 1320) plus the offset value 1740. So, in this example arrangement, the exception cache acts as an exception instruction cache but not as an exception address cache.

Figure 18:
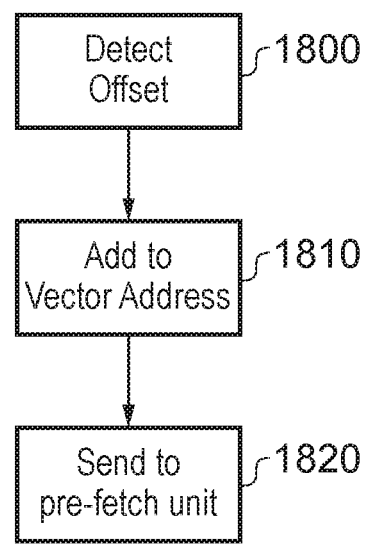
FIG. 18 is a schematic flowchart illustrating an address output step relating to the data structure of FIG. 17.

FIG. 18 is a schematic flowchart illustrating an address output step relating to the data structure of FIG. 17. At a step 1800, the exception cache detects the offset value 1740, either by retrieving it from storage or by counting the number of cached instructions 1730 and multiplying by the stored length of each individual instruction. At a step 1810, the offset value 1740 is added to the vector address (the start address of the program code region 1320) and about a step 1820 the resulting address [SA] is sent to the pre-fetch unit to form a next address to be fetched.

In an alternative example arrangement, the address [SA] is also cached. FIG. 19 schematically illustrates another example of a data structure of the exception cache of FIG. 14 in which address caching is used. Each entry in the exception cache is indexed by an index 1910 and comprises a valid flag 1920, a next fetch address 1930 and one or more cached instructions 1940.

FIG. 20 is a schematic flowchart illustrating an address output step relating to the data structure of FIG. 19. In response to an exception event relating to a valid cached entry, at a step 2000 the exception cache detects the cached address 1930 and, at a step 2010 the exception cache sends the cached address 1930 to the pre-fetch unit as a next address to be fetched.

As an alternative o the cache flushing arrangement of FIGS. 10 and 11, FIG. 21 is a schematic flow chart relating to a cache flushing operation; and FIG. 22 is a schematic diagram of a cache flushing arrangement.

These diagrams relate to an arrangement by which the cache itself, or logic associated with the cache, can initiate a cache flush operation, based on a comparison of data stored in the cache with the contents of a vector table.

Referring to FIG. 21, at a step 2100, a detection is made as to whether the instruction relating to the current vector (for a current exception) is a branch instruction. This can represent a detection of whether the instruction at the vector stage fe3 (for example, in the fourth cycle of FIG. 7) is a branch instruction. If not, then the process ends. If so, then control passes to a step 2110 at which a detection is made as to whether the branch target indicated by that instruction matches a cached address which is currently held in the cache and which is currently marked as valid. If so, then the process (as regards the flushing operation) ends. If not, control passes to a step 2120 at which (a) a flush operation is initiated (for example, in respect of the whole cache, just the cache entry relating to the current exception type and level, or a subset of cache entries including that cache entry) and (b) the normal operation to suppress branch handling is not performed.

FIG. 22 schematically illustrates circuitry, which could form part of the arrangement of FIG. 9, to achieve this functionality. A detector 2130 receives information such as details of the instruction at fe3 and the cache "hit address" and performs the comparisons discussed above. The detector 2130 instructs a controller 2140 to selectively flush one or more cache entries and/or suppress the normal handling of branch instructions as discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

What is claimed is:
1. Data processing apparatus comprising:
a processor configured to execute instructions, the processor having a pipelined instruction fetching unit configured to fetch instructions from memory during a pipeline period of two or more processor clock cycles prior to execution of those instructions by the processor;

exception logic configured to respond to a detected processing exception having an exception type selected from a plurality of exception types, by storing a current processor status and diverting program flow to an exception address dependent upon the exception type so as to control the instruction fetching unit to initiate fetching of an exception instruction at the exception address; and an exception cache configured to cache information, for at least one of the exception types, relating to execution of the exception instruction at the exception address corresponding to that exception type and to provide the cached information to the processor in response to detection of an exception of that exception type;

in which:

the exception cache is configured to cache information only in respect of instances in which the exception instruction is a branch instruction;

the cached information comprises an address dependent upon a branch target of that branch instruction;

the instruction fetching unit is configured to initiate fetching of an instruction at the branch target address in response to receipt of the cached information from the exception cache; and the exception cache is configured, in an instance in which the exception cache has provided a cached branch target address to the processor, to inhibit an operation of the processor in response to a branch instruction to delete any instructions currently being fetched by the pipelined instruction fetching unit.

2. Apparatus according to claim 1, in which the exception cache is configured to store a flag, associated with each exception type for which the exception cache is configured to cache information, indicating whether the exception cache holds currently valid information for that exception type, and to provide the cached information to the processor in response to detection of an exception of an exception type only if the respective flag indicates that the cached information is currently valid.

3. Apparatus according to claim 2, in which, in response to an instance of an exception type for which the respective flag indicates that the exception cache does not hold currently valid information, the exception cache is configured:
to derive and store information from the execution, by the processor, of the exception instruction; and
to set the flag associated with hat exception type to indicate that the exception cache holds currently valid information.

4. Apparatus according to claim 2, in which the apparatus is configured to detect an instance of a circumstance relating to one or more of the exception instructions, the circumstance being selected from the list consisting of:
(i) a change of one or more of the exception addresses;
(ii) a change of an instruction type of one or more of the exception instructions;
(iii) a write operation in respect of a memory address in a memory region including one or more of the exception addresses;
(iv) a change in memory type of a memory region including one or more of the exception addresses; and
(v) a mismatch between cached information relating to a currently handled exception and actual information relating to the currently handled exception;
and, in response to such a detection, the exception cache is configured to set at least some of the flags to indicate that the exception cache does not hold currently valid information.

5. Apparatus according to claim 1, in which, in response to a detected processing exception, the exception logic is configured to provide to the exception cache at least data defining the exception type of the detected processing exception; and data defining the exception address corresponding to the detected processing exception.

6. Apparatus according to claim 5, in which:
the exception cache is configured to cache information only in respect of a subset of he exception types; and
in response to a detected processing exception, the exception logic is configured to provide to the exception cache one or more flags indicating whether the detected processing exception has an exception type in the subset of exception types.

7. Apparatus according to claim 6, in which the subset of exception types consists of exception types corresponding to processor interrupts.

8. Apparatus according to claim 5, in which:
in response to a detected processing exception, the exception logic is configured to provide to the exception cache at least data defining an execution privilege relating to the detected processing exception; and
the exception cache is configured to cache information in respect of each of a set of two or more execution privileges.

9. Apparatus according to claim 1, in which the branch instruction is an unconditional branch instruction having a branch target address defined by address information forming part of the instruction.

10. Apparatus according to claim 1, in which the cached information comprises at least a representation of one or more instructions to be executed by the processor in response to the processing exception.

11. Apparatus according to claim 10, in which the one or more instructions comprise instructions selected from the list consisting of:
(i) one or more instructions starting from the exception address; and
(ii) one or more instructions starting from a branch target address of a branch instruction at the exception address.

12. Apparatus according to claim 10, in which the exception cache is configured to provide to the instruction fetching unit a next address for instruction fetching, the next address being an instruction address following, in the program flow, a last one of the instructions for which the exception cache provides representations to the processor.

13. A data processing method comprising:
fetching instructions from memory during a pipeline period of two or more processor clock cycles prior to execution of those instructions by a processor;
caching information, for at least one exception type of a plurality of possible exception types, relating to execution of an exception instruction at an exception address corresponding to that exception type, the caching step comprising caching information only in respect of instances in which the exception instruction is a branch instruction, the cached information comprising an address dependent upon a branch target of that branch instruction;
detecting a processing exception;
in response to a detected processing exception, storing a current processor status and diverting program flow to the exception address dependent upon the exception type of the detected processing exception so as to initiate fetching of an exception instruction at the exception address;

providing the cached information relating to the exception type of the detected processing exception to the processor;

initiating fetching of an instruction at the branch target address in response to receipt of the cached information from the exception cache; and inhibiting an operation of the processor in response to a branch instruction to delete any instructions currently being fetched by the fetching step, in an instance in which the providing step has provided a cached branch target address to the processor.

14. An exception cache configured to cache information, for at least one of a plurality of possible processing exception types of a processor, relating to execution of the exception instruction by the processor at an exception address corresponding to that exception type and to provide the cached information to the processor in response to detection of an exception of that exception type, the exception cache comprising a flag, associated with each exception type for which the exception cache is configured to cache information, indicating whether the exception cache holds currently valid information for that exception type;

in which:

the exception cache is configured to cache information only in respect of instances in which the exception instruction is a branch instruction, the cached information comprising an address dependent upon a branch target of that branch instruction; and the exception cache is configured, in an instance in which the exception cache has provided a cached branch target address to the processor, to inhibit an operation of the processor in response to a branch instruction to delete any instructions currently being fetched.

\* \* \* \* \*